(12) United States Patent
Lee et al.

(10) Patent No.: US 10,664,983 B2
(45) Date of Patent: May 26, 2020

(54) METHOD FOR PROVIDING VIRTUAL REALITY INTERFACE BY ANALYZING IMAGE ACQUIRED BY SINGLE CAMERA AND APPARATUS FOR THE SAME

(71) Applicant: DEEPIXEL INC., Seoul (KR)

(72) Inventors: Jehoon Lee, Seoul (KR); Wahseng Yap, Suwon-si (KR); Honam Ahn, Seoul (KR)

(73) Assignee: DEEPIXEL INC., Seoul (KR)

(*) Notice: Subject to any disclaimer, the term of this patent is extended or adjusted under 35 U.S.C. 154(b) by 12 days.

(21) Appl. No.: 15/552,770

(22) PCT Filed: Apr. 17, 2017

(86) PCT No.: PCT/KR2017/004123
§ 371 (c)(1),
(2) Date: Aug. 22, 2017

(87) PCT Pub. No.: WO2018/048054
PCT Pub. Date: Mar. 15, 2018

(65) Prior Publication Data
US 2018/0275764 A1    Sep. 27, 2018

(30) Foreign Application Priority Data
Sep. 12, 2016 (WO) ................ PCT/KR2016/010273

(51) Int. Cl.
*G06F 3/048* (2013.01)
*G06T 7/536* (2017.01)
(Continued)

(52) U.S. Cl.
CPC ............. *G06T 7/536* (2017.01); *G06F 3/011* (2013.01); *G06F 3/013* (2013.01); *G06F 3/017* (2013.01);
(Continued)

(58) Field of Classification Search
None
See application file for complete search history.

(56) References Cited

U.S. PATENT DOCUMENTS

2011/0129124 A1*   6/2011   Givon ................ G06F 3/011
                                                         382/107
2012/0050480 A1    3/2012   Seshadri et al.
(Continued)

FOREIGN PATENT DOCUMENTS

KR   10-2006-0019273 A   3/2006
KR   10-2012-0020081 A   3/2012
(Continued)

*Primary Examiner* — William C Trapanese
(74) *Attorney, Agent, or Firm* — Novick, Kim & Lee, PLLC; Sang Ho Lee

(57) ABSTRACT

A method for implementing a virtual reality (VR) interface based on a single camera. The method includes obtaining pointer coordinates based on an image obtained by a single camera attached to a VR device, converting the pointer coordinates into virtual pointer coordinates based on a distance factor between the single camera and the VR device and a user factor including an input range of a real space derived according to a body characteristic of a user, and displaying the converted virtual pointer coordinates on the VR device.

16 Claims, 15 Drawing Sheets

(51) Int. Cl.
*G06F 3/0482* (2013.01)
*G06F 3/0484* (2013.01)
*G06T 7/579* (2017.01)
*G06T 7/11* (2017.01)
*G06T 7/246* (2017.01)
*G06T 7/73* (2017.01)
*G06F 3/01* (2006.01)
*G06F 3/0481* (2013.01)
*G06K 9/00* (2006.01)
*G06K 9/46* (2006.01)

(52) U.S. Cl.
CPC ........ *G06F 3/0482* (2013.01); *G06F 3/04815* (2013.01); *G06F 3/04842* (2013.01); *G06K 9/00355* (2013.01); *G06K 9/00375* (2013.01); *G06K 9/4604* (2013.01); *G06T 7/11* (2017.01); *G06T 7/246* (2017.01); *G06T 7/251* (2017.01); *G06T 7/579* (2017.01); *G06T 7/73* (2017.01); *G06F 3/012* (2013.01); *G06T 2207/30196* (2013.01)

(56) References Cited

U.S. PATENT DOCUMENTS

| | | |
|---|---|---|
| 2013/0154913 A1 | 6/2013 | Genc et al. |
| 2013/0283208 A1 | 10/2013 | Bychkov et al. |
| 2015/0253864 A1 | 9/2015 | Parkhomenko et al. |
| 2015/0358614 A1 | 12/2015 | Jin |
| 2015/0378444 A1 | 12/2015 | Yin et al. |
| 2017/0140552 A1* | 5/2017 | Woo ................... G06F 1/163 |

FOREIGN PATENT DOCUMENTS

| | | |
|---|---|---|
| KR | 10-2013-0108643 A | 10/2013 |
| KR | 10-2014-0126529 A | 10/2014 |
| KR | 10-2016-0000873 A | 1/2016 |
| KR | 10-2016-0001699 A | 1/2016 |
| WO | 2015/199470 A1 | 12/2015 |

\* cited by examiner

METHOD FOR PROVIDING VIRTUAL REALITY INTERFACE BY ANALYZING IMAGE ACQUIRED BY SINGLE CAMERA AND APPARATUS FOR THE SAME

TECHNICAL FIELD

The present disclosure relates to a method for implementing a virtual reality (VR) interface by analyzing an image obtained by a single camera, estimating a three-dimensional (3D) location, and converting the estimated location into VR coordinates, a storage medium for storing a program for executing this method, and an apparatus for implementing the VR interface based on the single camera.

BACKGROUND ART

A manner of wearing a goggle type of a head mounted display (HMD) has been widely used to experience virtual reality (VR). A user may control objects or user interface (UI) elements of VR using a gaze pointer or a reticle located on a central point of a virtual space.

When each of general VR devices renders a virtual space in a suitable manner according to motion of a head, a gaze pointer or a reticle may be located on a central point of the virtual space always in such a process.

In using an interface based on such a gaze pointer or a reticle, a manner where the user moves his or her head to locate the gaze pointer or the reticle on a specific object disposed on a virtual space and activate the object, maintains the gaze pointer or the reticle on the object during a constant time or more, and executes an event of the object (corresponding to a "click" operation of a mouse or a "touch" operation of a touch pad) may be proposed as one example.

In addition, if using meta or universal menus, for example, functions of ending a driving application, ending a VR system, capturing or recording a corresponding screen, and changing to another application, the user may use a separate physical button mounted on the outside of an HMD.

As such, the interface based on the gaze pointer or the reticle may have limited availability. In addition, since it is possible for the gaze pointer or the reticle to access only an object, located on a straight line which is identical to a head direction of the user, always, a head direction should be changed to select a specific object located on a virtual space or perform a specific function. In addition, it is impossible to separately access objects located in different depths.

As a result, since a three-dimensional (3D) pointer may fail to move together in x-, y-, and z-axes through the interface based on the gaze pointer or the reticle, and since only a selection or execution event for an object occurs, there may be significant limits to control a virtual space.

Meanwhile, to obtain 3D depth information in image processing, image information may be obtained using a device, such as a structured light, a stereo camera, an infra-red camera, or an infra-red laser, and an image may be three-dimensionally restored to obtain 3D location information in the image.

As another example, there is a method in which the user wears an input glove on his or her hand or attaches a 3D marker to part of his or her body to obtain 3D location information.

A method for constituting a system which has two different fields of view using an image obtained by an infra-red camera and an image obtained from a reflected view from a mirror in a device including a single camera and the mirror to obtain 3D location information is proposed as well as this method.

Meanwhile, there is a need for separate equipment to obtain 3D location information in such methods. Calculation processing for images may be complex, and loads may occur in the processing.

The patent application claims priority to international patent application No. PCT/KR2016/010273, on Sep. 12, 2016. The corresponding entire application is hereby incorporated by reference in the specification for all purposes.

DETAILED DESCRIPTION OF THE INVENTION

Technical Problem

An aspect of the present disclosure is to provide a method and an apparatus for implementing a VR interface based on a single camera to three-dimensionally estimate a location of a finger of a user and a change in location, obtain pointer coordinates, and perform an interface through the obtained pointer coordinates.

Another aspect of the present disclosure is to provide a method and an apparatus for implementing a VR interface based on a single camera to convert pointer coordinates obtained using the single camera into virtual pointer coordinates suitable for a VR device according to characteristics of the VR device and a user of the VR device, perform a command associated with an operation analyzed according to a change in the pointer coordinates, and perform a VR interface.

Technical Solution

In accordance with an aspect of the present disclosure, a method for implementing a VR interface based on a signal camera is provided. The method may include obtaining pointer coordinates based on an image obtained by a single camera attached to a VR device, converting the pointer coordinates into virtual pointer coordinates based on a distance factor between the single camera and the VR device and a user factor including an input range of a real space derived according to a body characteristic of a user, and displaying the converted virtual pointer coordinates on the VR device.

In an embodiment, the obtaining of the pointer coordinates based on the image obtained by the single camera attached to the VR device may include storing the image obtained by the single camera on a frame-by-frame basis, determining a plurality of feature points configuring a hand shape of the user, the hand shape being included in the stored image, and extracting a region of interest (ROI) based on the feature points, tracking a change in a 2D length component configured with feature points of the ROI during a predetermined time interval, and obtaining relative 3D pointer coordinates by analyzing a change in 3D coordinates of the feature points based on the change in the 2D length component and deriving a motion vector of the feature points during the predetermined time interval based on the analysis.

According to an embodiment, the converting of the pointer coordinates into the virtual pointer coordinates may include converting the pointer coordinates into a coordinate system of the single camera by performing inverse projection matrix calculation, converting the coordinate system of the single camera into an input range coordinate system of a real space around the VR device based on the distance factor, converting the input range coordinate system of the real space into a virtual input range coordinate system based on a scale parameter and the user factor of a virtual space and the real space, and converting the pointer coordinates into the virtual pointer coordinates by performing conversion in a depth direction with respect to the virtual input range coordinate system.

In an embodiment, the performing of the conversion in the depth direction with respect to the virtual input range coordinate system may include performing the conversion in the depth direction based on a distance of the depth direction between the center of the VR device and an origin point of the input range coordinate system of the real space and a distance of the depth direction between the VR device and a gaze of the user.

In an embodiment, the distance factor may include a first factor corresponding to a distance of the depth direction between a gaze of the user who wears the VR device and the single camera, a second factor corresponding to a distance of a first direction substantially orthogonal to the depth direction between the center of the VR device and the single camera, and a third factor corresponding to a distance of the depth direction between a real camera space considering a field of view of the single camera and the center of the VR device. The converting of the coordinates of the single camera into the input range coordinate system of the real space around the gaze of the user may include performing the conversion in the depth direction based on the first factor and the third factor and performing conversion in the first direction based on the second factor.

In an embodiment, the converting of the pointer coordinates into the virtual pointer coordinates by performing of the conversion in the depth direction with respect to the virtual input range coordinate system may include converting the pointer coordinates into the virtual pointer coordinates by performing the conversion in the depth direction based on the scale parameter and the third factor.

In an embodiment, the method further include displaying a guide screen for matching 2D coordinates of at least one feature point of the hand shape of the user, the 2D coordinates being displayed as the virtual pointer coordinates, to a gaze pointer of the VR device.

In an embodiment, the converting of the pointer coordinates into the virtual pointer coordinates may include deriving at least one of the distance factor and the user factor based on a user identifier.

In an embodiment, the displaying of the converted virtual pointer coordinates on the VR device may include, if a predetermined pointer operation is performed in a state where the converted virtual pointer coordinates are matched to coordinates of a selection unit of the VR device, performing a sub-command linked with the selection unit.

According to an embodiment, the method may further include determining an operation indicated by the hand shape based on a converted motion vector and regarding the determined operation as a pointer operation.

In an embodiment, the selection unit may correspond to a gaze pointer of the user. A virtual space of VR may move by performing a pointer operation corresponding to an operation in which the virtual pointer coordinates are dragged during a predetermined time in a state where the gaze point is matched to the converted virtual pointer coordinates.

In accordance with another aspect of the present disclosure, a computer-readable storage medium may store a program for performing the method for implementing the VR interface based on the signal camera.

In accordance with another aspect of the present disclosure, an apparatus for implementing a VR interface based on a signal camera is provided. The apparatus may include a 3D image analyzing means configured to obtain pointer coordinates based on an image obtained by the single camera attached to a VR device, a virtual pointer coordinate converting means configured to convert the pointer coordinates into virtual pointer coordinates based on a distance factor between the single camera and the VR device and a user factor including an input range of a real space derived according to a body characteristic of a user, and a display means configured to display the converted virtual pointer coordinates on the VR device.

In an embodiment, the 3D image analyzing means may include an image obtaining unit configured to store the image obtained by the single camera on a frame-by-frame basis, an image extracting unit configured to determine a plurality of feature points configuring a hand shape of the user, the hand shape being included in the stored image, and extract an ROI based on the feature points, an image tracking unit configured to track a change in a 2D length component configured with feature points of the ROI during a predetermined time interval, and an image analyzing unit configured to obtain relative 3D pointer coordinates by analyzing a change in 3D coordinates of the feature points based on the change in the 2D length component and deriving a motion vector of the feature points during the predetermined time interval based on the analysis.

In an embodiment, the virtual pointer coordinate converting means may include a real space coordinate converting unit configured to convert the pointer coordinates into a coordinate system of the single camera by performing inverse projection matrix calculation and convert the coordinate system of the single camera into an input range coordinate system of a real space which uses a gaze of the user as an origin point, based on the distance factor and a virtual space coordinate converting unit configured to convert the input range coordinate system of the real space into a virtual input range coordinate system based on a scale parameter and the user factor of a virtual space and the real space and convert the pointer coordinates into the virtual pointer coordinates by performing conversion in a depth direction with respect to the virtual input range coordinate system.

In an embodiment, the virtual pointer coordinate converting means may further include a storage unit configured to manage the distance factor and the user factor for each user and for each VR device.

In an embodiment, the storage unit may manage a user factor database according to a characteristic of the single camera for each type of a specific VR device and a body characteristic of the user.

In an embodiment, the apparatus may further include an interface unit configured to determine an operation indicated by the hand shape based on a converted motion vector, regard the determined operation as a pointer operation, and perform a VR interface operation.

In an embodiment, if a predetermined pointer operation is performed in a state where the converted virtual pointer coordinates are matched to coordinates of a selection unit of the VR device, the interface unit may perform a sub-command linked with the selection unit. For example, the selection unit may correspond to a gaze pointer of the user.

Advantageous Effects of the Invention

Various embodiments disclosed in the present disclosure may analyze an image obtained by a single camera included in a VR device and may ascertain a pointer including depth information, for example, 3D location information of a finger. Therefore, various embodiments may reduce complexity of calculation for analyzing a 3D image by analyzing the 3D image based on an image obtained by the single camera without separate equipment and may facilitate 3D control in the VR device.

Various embodiments disclosed in the present disclosure may provide a control interface optimized for the VR device by converting a coordinate system of a pointer three-dimensionally analyzed based on an image obtained by the single camera included in the VR device to display the converted pointer on VR without incompatibility. According to the present disclosure, there is no necessity for having a separate device for an interface through the VR device.

Various embodiments disclosed in the present disclosure are for examples. Those skilled in the art will appreciate that various modifications, alternatives, and additions are possible through the spirit and scope of the attached claims. It is understood that such modifications and the like belong to the accompanying claims.

BEST MODE

Hereinafter, various embodiments of the present disclosure may be described in detail with reference to the accompanying drawings. The same denotations refer to the same elements on drawings in the specification, and a description by the same elements may be omitted.

The specific structural or functional description is merely illustrative for the purpose of describing embodiments of the present disclosure with respect to various embodiments of the present disclosure disclosed herein. Various embodiments of the present disclosure may be implemented in various forms, and may not be construed as limited to the embodiments set forth herein.

Expressions such as "$1^{st}$", "$2^{nd}$" "first" and "second" used in various embodiments may be used to refer to various elements regardless of the order and/or the priority, but the above elements should not be restricted to the above expressions. For instance, the first element may be named the second element, and vice versa, without departing the scope of claims of the present disclosure.

The terms used in the specification are intended to describe certain embodiments only, and should by no means restrict the scope of another embodiment. Unless clearly used otherwise, expressions in a singular form include a meaning of a plural form.

All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in the present disclosure, they may not be interpreted to exclude embodiments of the present disclosure.

Figure 1:
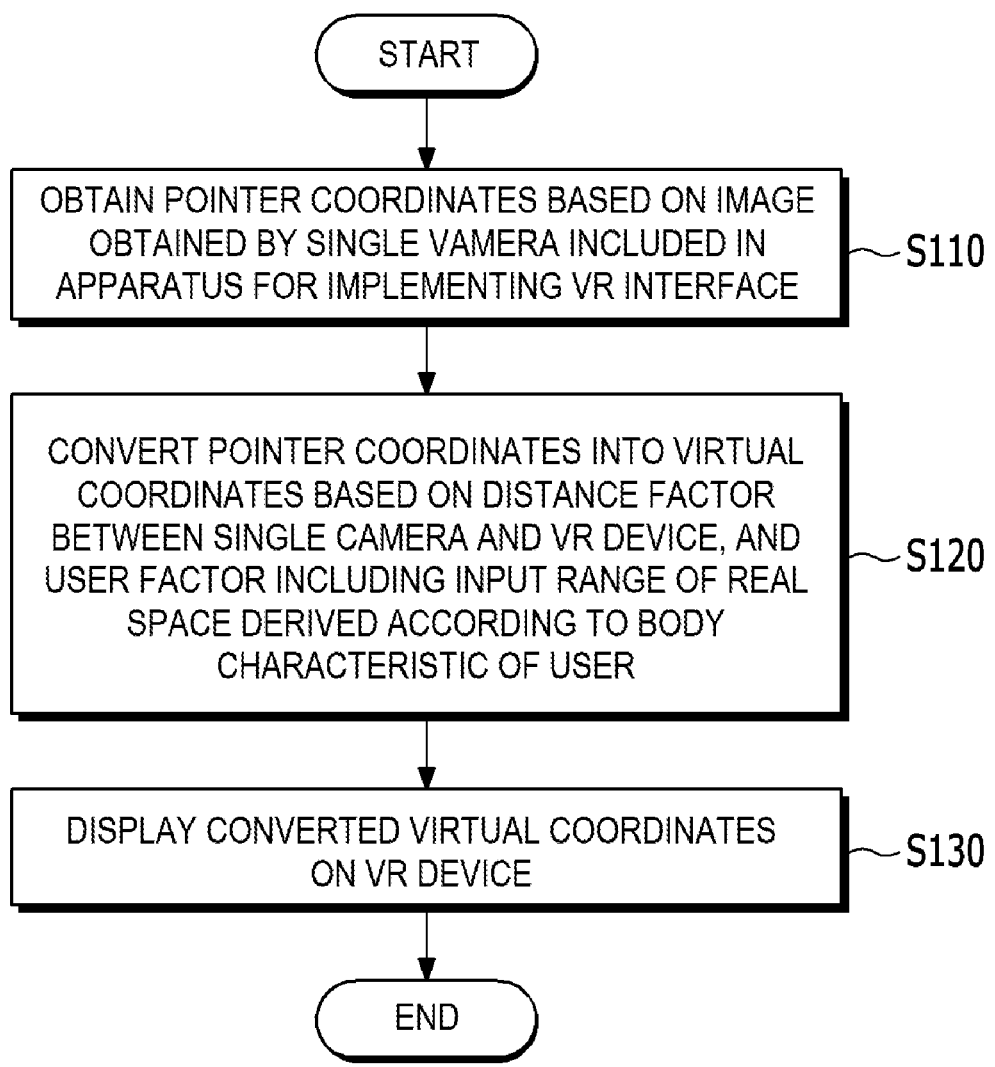
FIG. 1 is a flowchart illustrating a method for implementing a VR interface based on a single camera according to an embodiment of the present disclosure.

FIG. 1 is a flowchart illustrating a method for implementing a VR interface based on a single camera according to an exemplary embodiment of the present disclosure.

Referring to FIG. 1, the method for implementing the virtual interface according to an exemplary embodiment of the present disclosure may include obtaining pointer coordinates based on an image obtained by a single camera included in an apparatus for implementing the VR interface (S110), converting the pointer coordinates into virtual pointer coordinates based on a distance factor between the single camera and a VR device, and a user factor including an input range of a real space derived from a body characteristic of a user (S120), and displaying the converted virtual pointer coordinates on the VR device (S130).

According to an embodiment, the obtaining of the pointer coordinates based on the image obtained by the single camera included in the apparatus for implementing the VR interface may include analyzing a pointer operation corresponding to an event with respect to the image obtained by the single camera. In other words, pointer coordinates may be obtained by analyzing the image obtained by the single camera, and a pointer operation result may be provided if it is analyzed that a pointer operation associated with a previously stored command occurs as a result of viewing motion of the pointer coordinates during a predetermined time interval.

Figure 2:
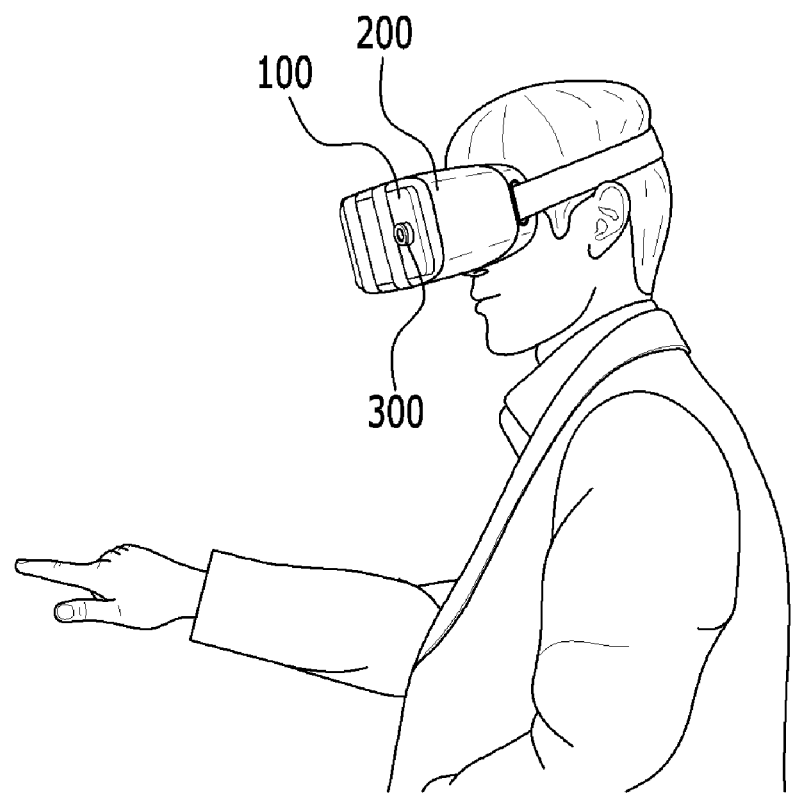
FIG. 2 is a drawing illustrating an appearance in which a user uses an apparatus for implementing a VR interface based on a single camera according to an embodiment of the present disclosure.

The method for implementing the VR interface according to an exemplary embodiment of the present disclosure may be implemented by the apparatus for implementing the VR interface. FIG. 2 is a drawing illustrating an appearance in which a user uses an apparatus for implementing a VR interface based on a single camera according to an exemplary embodiment of the present disclosure.

Referring to FIG. 2, the apparatus for implementing the VR interface may include, a VR device 100, a fixing device 200, to which the VR device 100 is fixed, configured to be worn on the user, and a single camera 300.

The single camera 300 may be mounted on the VR device 100 and may be replaced with a gaze of the user. Thus, the single camera 300 may be located to face a direction the user looks at. A display (not shown) is provided on a real surface of the VR device 100, on which the single camera 300 is located, to display VR to the user. For example, fixing device 200 on which the VR device 100 is mounted are totally called a head mounted display (HMD). For example, the fixing device 200 may include a VR goggle and a head gear.

In FIG. 2, an embodiment is exemplified as the single camera 300 is mounted on the VR device 100. Hereinafter, a description will be given of the embodiment. However, the single camera 300 may be implemented to be mounted on the fixing device 200 or be independent of the fixing device 200.

An apparatus for implementing the VR interface based on the single camera according to an exemplary embodiment of the present disclosure may display virtual pointer coordinates on VR by recognizing a point having a feature point, such as a finger of a person, based on the single camera and three-dimensionally analyzing coordinates of the pointer and may perform interfacing operation with various units displayed on the VR. Particularly, in an embodiment of the present disclosure, since it is possible to perform 3D analysis of an image obtained by the single camera, virtual pointer may be three-dimensionally implemented through a VR device. Thus, there may be no necessity for having a separate control means, such as a joystick, to control VR. Therefore, an apparatus and a method for implementing the VR interface according to an exemplary embodiment of the present disclosure may depart from 2D control such as moving a gaze on VR to select a specific unit.

In addition, the apparatus for implementing the VR interface based on the single camera and the method for implementing the VR interface using the same according to various embodiments of the present disclosure may minimize incompatibility between a gaze of the user and a control operation. This incompatibility may be obtained by converting an image obtained by the single camera to be maximally identical to an image viewing at the gaze of the user, and converting coordinates of the converted image into a VR coordinate system.

In FIG. 2, an embodiment is exemplified as the apparatus for implementing the VR interface includes the fixing device and the single camera. In FIG. 2, the description is given of the embodiment. However, the apparatus for implementing the VR interface may be sufficient to include an image sensor which performs the same function as that of the VR device and the single camera. Hereinafter, a description will be given in detail of the apparatus for implementing the VR interface according to an exemplary embodiment of the present disclosure with respect to FIG. 3.

Figure 3:
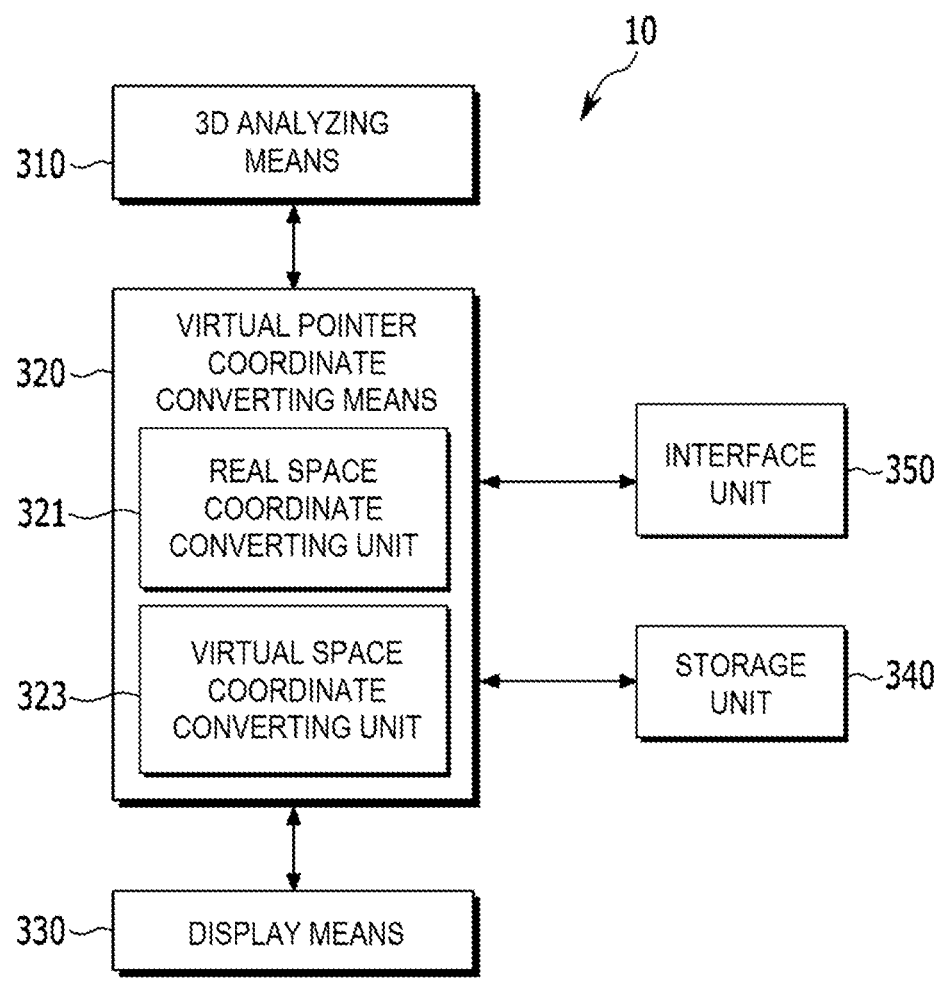
FIG. 3 is a block diagram schematically illustrating an apparatus for implementing a VR interface based on a single camera according to an embodiment of the present disclosure.

FIG. 3 is a block diagram schematically illustrating an apparatus for implementing a VR interface based on a single camera according to an exemplary embodiment of the present disclosure.

FIG. 2 illustrates only elements which physically appear, and FIG. 3 illustrates blocks divided in functional aspects. Referring to FIG. 3, an apparatus 10 for implementing a VR interface may include a 3D image analyzing means 310, a virtual pointer coordinate converting means 320, and a display means 330.

The 3D image analyzing means 310 may obtain pointer coordinates based on an image obtained by a single camera attached to a VR device. According to an embodiment, the 3D image analyzing means 310 may derive a motion vector by obtaining and storing an image on a frame-by-frame basis during a predetermined time and analyzing a feature point of the obtained image and thus may obtain 3D pointer coordinates from the image obtained by the single camera.

A description will be given of an element and operation of the 3D image analyzing means 310 with reference to FIGS. 4 to 9C.

According to an embodiment, when motion of pointer coordinates during a predetermined time corresponds to a pointer operation relevant to a predetermined command, the 3D image analyzing means 310 may detect the pointer operation and may transmit the detected pointer operation information. The pointer operation information may be provided to an interface unit 350 via the virtual coordinate converting means 320 or may be immediately transmitted to the interface unit 350. According to an embodiment, the interface unit 350 may detect a pointer operation itself.

The virtual pointer coordinate converting means 320 may convert pointer coordinates into virtual pointer coordinates based on a distance factor between a single camera 300 and a VR device 200, and a user factor including an input range of a real space derived according to a body characteristic of a user. A description will be given in detail of the converting of the pointer coordinates into the virtual pointer coordinates with reference to FIGS. 10 and 11.

According to an embodiment, the virtual pointer coordinate converting means 320 may include a real space coordinate converting unit 321 and a virtual space coordinate converting unit 323. The real space coordinate converting unit 321 may convert the pointer coordinates into a coordinate system of the single camera by performing inverse projection matrix calculation and may convert the coordinate system of the single camera into an input range coordinate system of a real space, which uses a gaze of the user as an origin point. Gap between the single camera 300 and a gaze of the user may be removed through coordinate conversion of the real space.

The virtual space coordinate converting unit 323 may convert an input range coordinate system of the real space into a virtual input range coordinate system based on a scale parameter of a virtual space and the real space, and a user factor. The virtual space coordinate converting unit 323 may convert the pointer coordinates into virtual pointer coordinates by converting the virtual input range coordinate system in a depth direction. The virtual space coordinate converting unit 323 may adjust a scale between the virtual space and the real space in converting the real space into the virtual space and may adjust an input range between the virtual space and the real space to naturally display pointer coordinates as virtual pointer coordinates in the virtual space.

The display means 330 may display the converted virtual pointer coordinates on a VR device. As described above, as shown in FIG. 2, a display may be provided on a VR device 200. Virtual pointer coordinates may be displayed to the user on such a display.

According to an embodiment, the apparatus 100 for implementing the VR interface based on the single camera may further include a storage unit 340 which manages a distance factor and a user factor necessary for converting pointer coordinates into virtual pointer coordinates with regard to respective user or to respective VR device.

The apparatus 10 for implementing the VR interface based on the single camera may derive difference factors with regard to respective user or to respective VR device based on the distance factor and the user factor stored in the storage unit 340 and may convert coordinates. For example, a different user factor may be derived with regard to respective user, and a different distance factor may be derived with regard to respective VR device.

The apparatus 10 for implementing the VR interface may update the user factor or the distance factor stored in the storage unit 340 based on accumulated data through a continuous operation. According to an embodiment, the user who initially uses the apparatus 10 for implementing the VR interface based on the single camera may set a user factor and/or a distance factor through a registration and calibration process and may record and manage respective factors in the storage unit 340, associated with an identifier of the user or a VR device.

According to an embodiment, the apparatus 10 for implementing the VR interface may perform different coordinate conversion processes for a registered user and an unregistered user. For example, the apparatus 10 for implementing the VR interface may obtain all of user factors stored in the storage unit 340 based on the user identifier or the VR device identifier for the registered user, whereas it may perform a process of obtaining a distance factor and a user factor for an initially registered user.

During registration and calibration processes of the user, the apparatus 10 for implementing the VR interface may display virtual pointer coordinates, which do not have a 3D value still, that is, do not obtain 3D coordinates, as ray-casted coordinates. In other words, virtual pointer coordinates displayed on the VR device 100 may be displayed with only coordinates (x, y) in which there is no z coordinate value. When a setting of a distance factor and a user factor is completed after the registration and calibration processes are completed, 2D virtual pointer coordinates may be displayed as 3D virtual pointer coordinates through a change in a size of virtual pointer coordinates or the like.

According to an embodiment, in a registration and calibration process corresponding to a process of obtaining a factor for converting coordinates using a VR interface, the apparatus 10 for implementing the VR interface may more easily obtain a user factor and a distance factor by displaying a guide screen such that ray-casted virtual pointer coordinates are matched to a gaze pointer of a VR device on the display means 330.

The storage unit 340 may manage a user factor database (DB) storing a body characteristic of the user, and store characteristics of respective single camera of a specific VR device. For example, the storage unit 340 may manage a resolution dot per inch (DPI) value of a single camera mounted on a corresponding model according to a model name of a VR device and may manage shoulder width information and arm length information according to a height or average body size information such as an average height of an adult. Such data may be basic information for deriving a distance factor or a user factor. As the storage unit 340 manages values a distance factor or a user factor may generally have, the distance factor and the user factor may be extracted and used from a DB if only minimum information is provided from the user.

According to an embodiment, the apparatus 10 for implementing the VR interface based on the single camera may further include the interface unit 350. The interface unit 350 may determine an operation indicated by a hand shape, that is, pointer coordinates based on 3D pointer coordinates analyzed by the 3D image analyzing means 310 or converted 3D virtual pointer coordinates, may regard the determined operation as a pointer operation, and may perform an interface operation on VR.

For example, when a specific pointer operation is performed in a state where the converted virtual pointer coordinates are matched to coordinates of a selection unit of a VR device, the interface unit 350 may perform a sub-command assigned to a pointer operation or a sub-command associated with the selection unit.

For example, the selection unit may correspond to a gaze pointer. When a pointer operation corresponding to a command, such as a click, is performed through virtual pointer coordinates after the virtual pointer coordinates are matched to the gaze pointer, the entire selection menu may be displayed. In another embodiment, when a pointer operation corresponding to a command, such as a drag, is performed through the virtual pointer coordinates after the virtual pointer coordinates are matched to the gaze pointer, the virtual space itself may be moved according to the pointer operation.

As described above, according to an embodiment, detection of the pointer operation may performed by the 3D image analyzing means 310, and the detected pointer operation information may be transmitted to the interface unit 350.

A description will be in detail of a pointer operation through the interface unit 350 and execution of a command according to the pointer operation with reference to FIGS. 12 to 21.

A description will be given of obtaining pointer coordinates based on an image obtained by a single camera attached to a VR device with reference to FIGS. 4 to 9.

Figure 4:
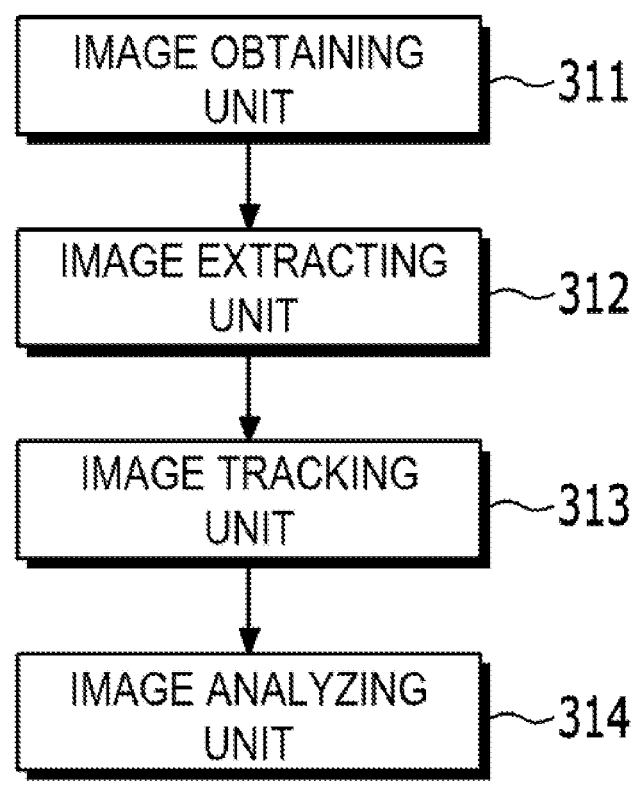
FIG. 4 is a block diagram illustrating a 3D image analyzing means according to an embodiment of the present disclosure.
Figure 5:
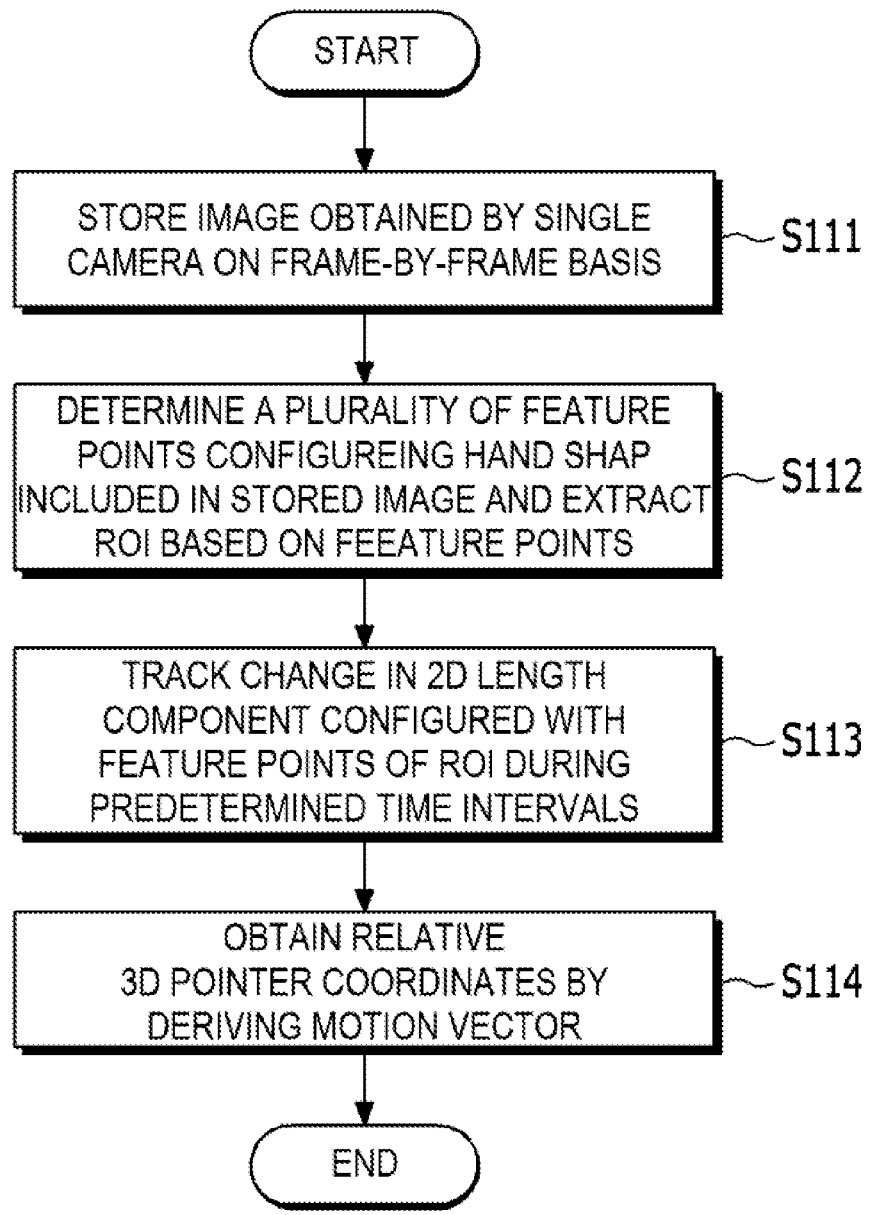
FIG. 5 is a flowchart illustrating a 3D image analyzing method.

FIG. 4 is a block diagram illustrating a 3D image analyzing means according to an exemplary embodiment of the present disclosure. FIG. 5 is a flowchart illustrating a 3D image analyzing method.

Referring to FIG. 4, a 3D image analyzing means 310 may include an image obtaining unit 311, an image extracting unit 312, an image tracking unit 313, and an image analyzing unit 314. A description will be given of a 3D image analyzing method by the 3D image analyzing means 310 with reference to FIGS. 4 and 5.

Referring to FIG. 5, in step S111, the image obtaining unit 311 of the 3D image analyzing means 310 may store an image obtained by a single camera 200 on a frame-by-frame basis.

The image obtaining unit 311 may obtain consecutive images on a frame-by-frame basis using an image obtaining means such as the single camera 300. For example, the image obtaining unit 311 may obtain a moving image during a predetermined time in real time and may store the obtained image on a frame-by-frame basis in a storage means such as a cache.

The 3D image analyzing means 310 according to an embodiment of the present disclosure may estimate a change in 3D coordinates of an image based on the image obtained from a single gaze by the single camera 300.

Receiving the image obtained by the image obtaining unit 311, in step S112, the image extracting unit 312 may determine a pointer included in a stored image, for example, a plurality of feature points configuring a hand shape and may extract a region of interest (ROI) based on the determined feature points.

According to an embodiment, the image extracting unit 312 may determine the plurality of feature points from the hand shape included in an image of a frame unit and may extract the ROI based on the determined feature points. The ROI in the specification may be called an image region necessary for determining a feature point from the obtain image and analyzing a change in location during a predetermined time interval. The image extracting unit 312 may extract the ROI from the image of the frame unit, obtained by the image obtaining unit 311.

In the present disclosure, the image extracting unit 312 may specify a feature point according to various feature point determination schemes and may extract an ROI in different manners from one image of a frame unit.

In the specification, an embodiment is exemplified as the obtained image includes the hand shape. However, embodiments are not limited thereto. For example, the image extracting unit 312 may recognize a finger and a palm in the hand shape included in the obtained image and may determine finger feature points of ends of two fingers and a palm feature point of a palm boundary between the two fingers, thus extracting a quadrangular region configured with the feature points as an ROI.

Figure 6:
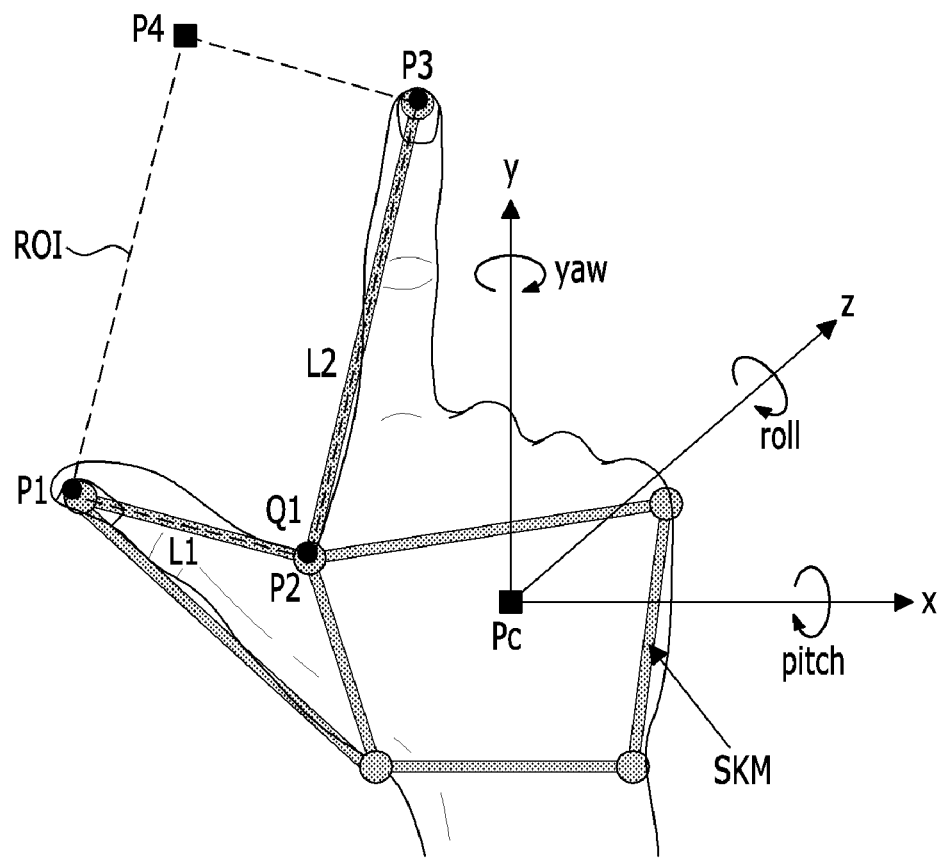
FIGS. 6 and 7 are drawings illustrating determined feature points and a region of interest (ROI) which is criteria of image analysis based on the feature points according to embodiments of the present disclosure.
Figure 7:
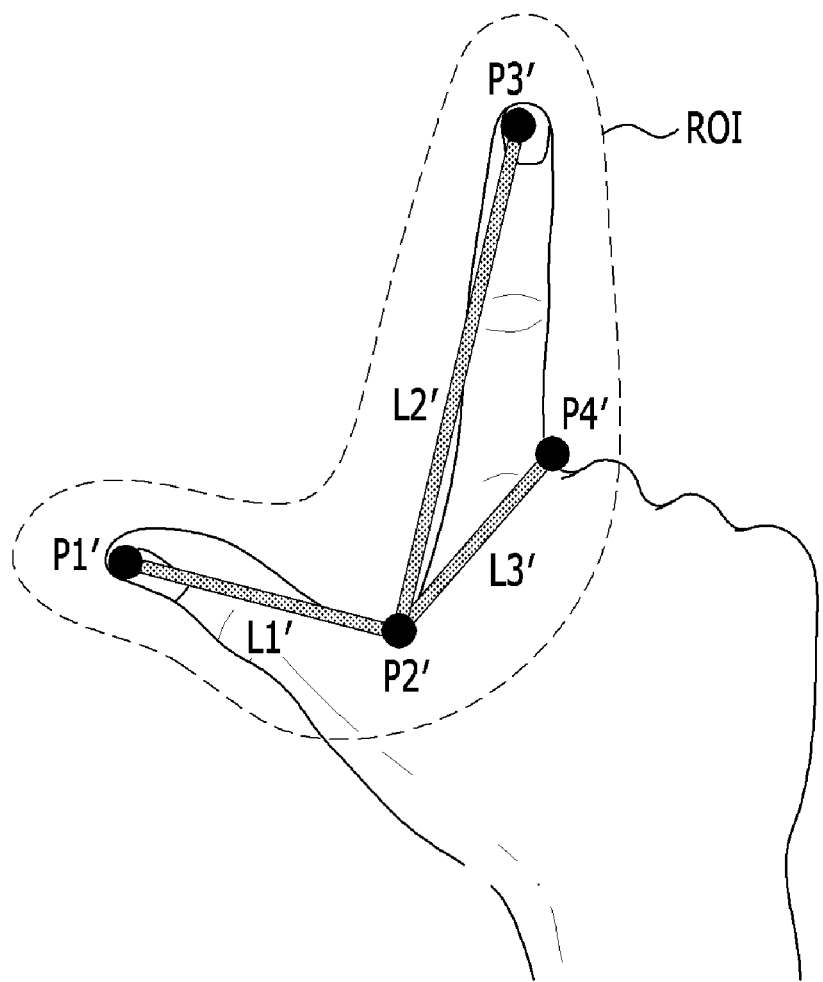

FIGS. 6 and 7 are drawings illustrating determined feature points and an ROI which is criteria of image analysis based on the feature points according to embodiments of the present disclosure. A description will be given of determining of a feature point, extracting of an ROI, tracking of a change in a 2D length component, and obtaining of 3D pointer coordinates based on respective embodiments.

Referring to FIG. 6, an image extracting unit 312 may determine ends of a thumb and an index finger in a hand shape as finger feature points P1 and P3 and may determine a palm feature point P2 of a palm boundary between the two fingers.

According to an embodiment, the image extracting unit 312 may set a virtual feature point P4 for configuring a quadrangular region including the finger feature points P1 and P3 and the palm feature point P2. The image extracting unit 312 may set the virtual feature point P4 for configuring a quadrangle together with the three feature points P1 to P3 and may extract the quadrangular region formed by the feature points P1 to P4 as an ROI.

An image segmentation algorithm and a feature extraction algorithm which are image processing algorithms may be performed together in the image extracting unit 312 to obtain an ROI. For image segmentation and feature extraction, the image extracting unit 312 may convert an image into another color channel or may remove a noise using an image filtering technique. Alternatively, the image extracting unit 312 may perform image pre-processing such as image normalization of an obtained image.

According to an embodiment, the image extracting unit 312 may define an observation model. For example, the image extracting unit 312 may perform modeling using a characteristic in which a nail portion and a finger portion generally have different colors or may perform modeling by previously registering a skin color of a user and learning a subtle change in the skin color by illumination whenever an image analysis is performed.

According to an embodiment, the image extracting unit 312 may update a feature value of a region around a finger, changed every frame, to a tracking model in real time. The image extracting unit 312 may more accurately determine a feature point according to the definition of observation model.

An image obtaining unit 311 may have a separate storage means and may minimize a computational load for image processing by extracting an ROI at the image extracting unit 312. For example, referring to FIG. 6 described hereafter, the ROI may correspond to a quadrangular region configured with finger feature points (P1 and P3 of FIG. 6) of ends of two adjacent fingers of a hand shape and a palm feature point (P2 of FIG. 6) of a palm boundary between the two fingers.

According to an embodiment, the image extracting unit 312 may determines a finger feature point and a palm feature point and may set a virtual feature point (P4 of FIG. 6) configuring a quadrangle with the finger feature point and the palm feature point.

In step S113, an image tracking unit 313 may track a change in a 2D length component configured with feature points of an ROI during a predetermined time interval. For example, the image tracking unit 313 may track a change in length components configured with a finger feature point and a palm feature point. According to an embodiment, the image tracking unit 313 may track a change in two length components between feature points of two fingers and a palm feature point between the two fingers.

According to an embodiment, the image tracking unit 313 may track a change in a first length component L1 between the first finger feature point P1 of an end of a thumb and the palm feature point P2 and a change in a second length component L2 between the second finger feature point P3 of an end of an index finger and the palm feature point P2.

According to an embodiment, the image tracking unit 313 may complete a hand shape skeleton (SKM of FIG. 6) corresponding to the length components L1 and L2 based on a skeleton model.

According to an embodiment, the image tracking unit 313 may complete a hand shape skeleton SKM corresponding to the length components L1 and L2 based on the skeleton model. Referring to FIG. 6, the image tracking unit 313 may complete the hand shape skeleton SKM corresponding to the two length components L1 and L2 and may set a center Pc of the hand shape according to the hand shape skeleton SKM.

When the first length component L1 or the second length component L2 is not defined in an image of a specific frame unit, for example, when an image for a finger end is not obtained in the specific frame unit, the image tracking unit 313 may estimate a location of each of the finger feature points P1 and P3 and may define a length component, by using the hand shape skeleton SKM. In other words, the image tracking unit 313 may estimate a location of a finger end based on the hand shape skeleton SKM.

In the present disclosure, the image tracking unit 313 may apply a tracking algorithm and skeleton modeling to facilitate robust location tracking. The tracking algorithm may be configured by combining one of particle filters and Kalman filters based on Bayesian, and a mean-shift algorithm for repeatedly estimating a mode of a probability density function of an image.

The image tracking unit 313 may track motion of a location of each the two length components L1 and L2 and a change in a length of each of the two length components L1 and L2. According to an embodiment, the image tracking unit 313 may track a change in an angle θ1 between the two length components L1 and L2 or location movement of each of the two length components L1 and L2.

In step S114, the image analyzing unit 314 may obtain relative 3D pointer coordinates as a result of analyzing a change in 3D coordinates of at least one of the feature points P1 to P4 based on a change in each of the 2D length components L1 and L2 and deriving a motion vector of feature points during a predetermined time interval based on such an analysis. For example, the change in each of the 2D length components L1 and L2 may be a change in location or a change in length. The change in each of the two length components L1 and L2 may be an independent change or a relative change.

As shown in Table 1, the image analyzing unit 314 may estimate a change in a coordinate of a depth direction for the finger feature points P1 and P3 based on a change in a length of at least one of the length components L1 and L2. According to an embodiment, the image analyzing unit 314 may estimate a change in rotation around a virtual axis of the center Pc of the hand shape based on a change in a length of at least one of the length components L1 and L2.

TABLE 1

| Case | Change in length component | | Change in coordinates of depth direction | |
|---|---|---|---|---|
| | L1 | L2 | P1 | P3 |
| 1 | Decrease in length | Decrease in length | Increase | Increase |
| 2 | Increase in length | Increase in length | Decrease | Decrease |
| 3 | No change | Decrease in length | No change | Increase |
| 4 | No change | Increase in length | No change | Decrease |
| 5 | Decrease in length | No change | Increase | No change |
| 6 | Increase in length | No change | Decrease | No change |
| 7 | No change | No change | No change | No change |

In the first case, both of the first length component L1 and the second length component L2 may decrease. In this case, since two fingers are equally becoming distant from an image obtaining means, it may be determined that the first feature point P1 and the third feature point P3 increases in a coordinate of a depth direction. In the specification, an embodiment is exemplified as being distant from the image obtaining means is represented as a coordinate of a depth direction increase. However, embodiments are not limited thereto.

On the other hand, in the second case, both of the first length component L1 and the second length component L2 may increase. Since it is determined that both of two fingers are becoming close toward the image obtaining means, it may be determined that the first feature point P1 and the third feature point P3 may decrease in a coordinate of a depth direction.

In the third case and the fourth case, there may be no change in a length of the first length component L1 and only the second length component L2 may decrease and increase in length, respectively. In the cases, since there is no change in the first length component L1, assuming that the entire hand is not moved, an operation in which the second length component L2 decreases may be analyzed as an operation in which an index finger faces the bottom. A description will be given of the operation with reference to FIG. 8.

Figure 8:
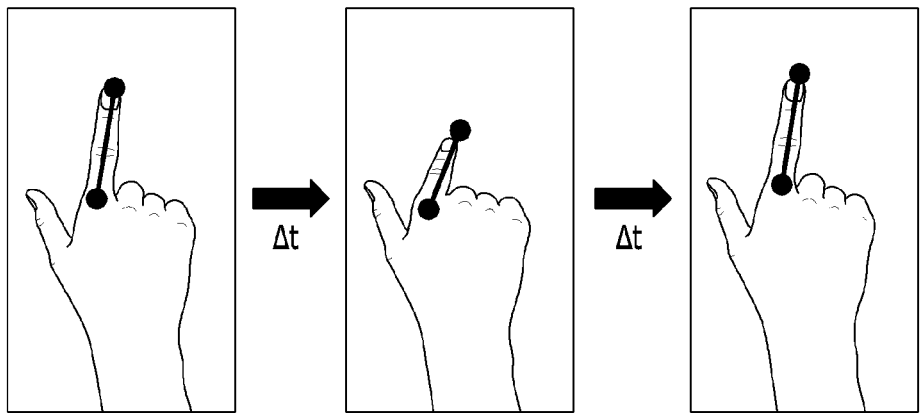
FIGS. 8 and 9 are drawings illustrating embodiments for analyzing 3D coordinates of a pointer according to an embodiment of the present disclosure.
Figure 9:
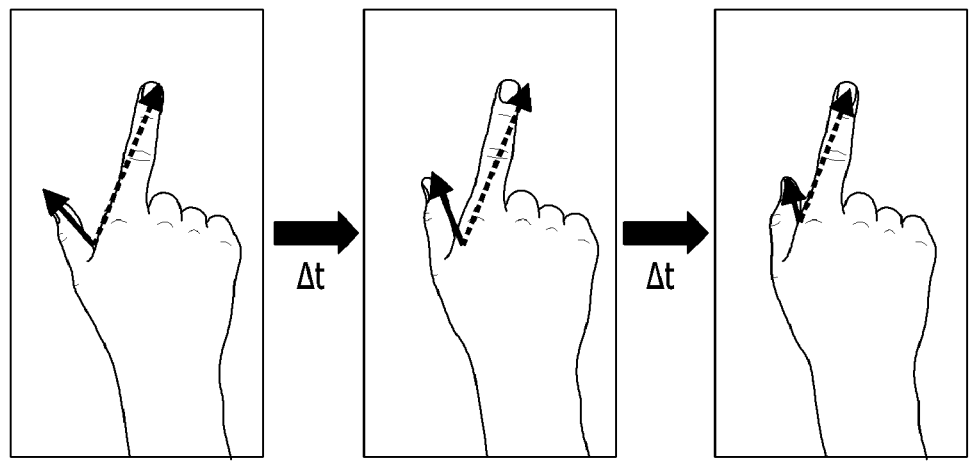

FIGS. 8 and 9 are drawings illustrating embodiments for analyzing 3D coordinates of a pointer according to an embodiment of the present disclosure.

Referring to (a) of FIG. 8, when a second length component L2 with the longest length is observed, an index finger may face a front surface with respect to an image obtaining means (e.g., a single camera). In such a state, when the index finger moves to the bottom toward a palm from the back of a user's hand as shown in (b) of FIG. 8, the second length component L2 facing the front surface may relatively decrease in length. Thus, a third feature point P3 may increase in a coordinate of a depth direction during a time interval of (a) to (b) of FIG. 8 (case 3 in Table 1).

On the other hand, if the index finger moves to raise a finger from a state of (b) of FIG. 8 to a state of (c) of FIG. 8 and face the front surface of the image obtaining means again, the second length component L2 may gradually increase. Thus, the third feature point P3 may decrease in a coordinate of a depth direction during a time interval from (b) to (c) in FIG. 8 (case 4 in Table 1).

An image analyzing unit 314 may derive a motion vector of feature points P1 and P3 during a predetermined time interval. According to an embodiment, the image analyzing unit 314 may determine a 3D change direction of a hand shape, that is, a motion pattern based on at least one of a motion vector, a change in rotation around a central axis of the hand shape, and an angle θ. In another embodiment, the image analyzing unit 314 may convert a change in motion of the hand shape during a predetermined time into 3D pointer coordinates. Since a coordinate of a z-axis direction of pointer coordinates varies according to an input range of a user, a z-axis may be a normalized value.

The image analyzing unit 314 may determine an operation indicated by the hand shape based on a motion vector or a change in 3D pointer coordinates and may derive a command matched to the determined operation, thus executing the derived command. According to an embodiment, the image analyzing unit 314 may manage the matched command with respect to a specific motion vector.

An image analyzing means 310 according to an embodiment of the present disclosure may monitor a change in the 2D length components L1 and L2 during a predetermined time interval and may analyze a change in 3D coordinates of the feature points P1 and P3. Further, in a third case, a vector composed of the third feature point P3 may be derived as a vector becoming distant from the image obtaining means, and, in a fourth case, the vector composed of the third feature point P3 may be derived as a vector facing the image obtaining means, according to the analysis of the change in the coordinates.

According to an embodiment, a vector becoming distant from the image obtaining means continues with a vector close to the image obtaining means again during a predetermined time, this operation may be detected as a pointer operation corresponding to "tap-in".

In the fifth case and the sixth case, there may be no change in a length of the second length component L2 and only a first length component L1 may decrease and increase in length, respectively. Similar to the third and fourth cases, in the fifth and sixth cases, since there is no change in the second length change L2, it may be determined assuming that the entire hand is not moved.

An operation in which the first length component L1 decreases in the fifth case may be analyzed as an operation in which the longest observed thumb toward a front surface gradually decreases in length toward the bottom.

On the other hand, an operation in which the reduced first length component L1 gradually increases in the sixth case may be analyzed as an operation in which the thumb facing the bottom becomes longer and longer in length while moving to the top again.

Thus, the image analyzing unit 314 may analyze that the first feature point P1 increases in a coordinate of a depth direction in the fifth case and may analyze that the first feature point P1 decreases in the coordinate of the depth direction in the sixth case.

The image analyzing unit 314 may derive a vector composed of the first feature point P1 as a vector becoming distant from the image obtaining means in the fifth case, may derive a vector composed of the first feature point P1 as a vector toward the image obtaining means in the sixth case, based on the analysis of the change in coordinates.

In the seventh case, there may be no change in the first and second length components L1 and L2. In this case, motion of a depth direction may be analyzed as a hand shape moves in a 2D plane or as an angle between the first and second length components L1 and L2 is changed.

Referring to FIG. 9, through (a) to (c), an operation in which there is no change in a length of each of the first length component L1 and the second length component L2 and in which an angle θ between the first length component L1 and the second length component L2 is changed may be verified. In other words, it may be verified that the angle θ between the first length component L1 and the second length component L2 continuously decreases in (a) to (c) of FIG. 9. In this case, a vector of a first feature point P1 may be converted into a motion vector facing a right upper end. The angle θ between the first length component L1 and the second length component L2 may be derived by determining 2D coordinates of the first feature point P1 and a third feature point P3.

According to an embodiment, the image analyzing unit 314 may estimate a change in rotation around a central axis of a hand shape skeleton based on a change in a coordinate of a depth direction.

Referring to FIG. 6, a 3D virtual axis may be set for a center Pc of a hand shape. Rotation of each axis may be called a pitch, a yaw, or a roll. Herein, the virtual axis may be relative to the center Pc of the hand shape, and a term which calls an axis may vary.

In each case described with reference to Table 1, the third case and the fourth case may be analyzed as a case where a hand rotates around an x-axis of FIG. 6. Further, the fifth case and the sixth case may be analyzed as a case where the hand rotates around a y-axis of FIG. 6. Finally, although both of the first length component L1 and the second length component L2 are not changed in length in the seventh case, the seventh case may be analyzed as a case where the hand rotates around a z-axis.

The image analyzing unit 314 may analyze an operation of a change in rotation around a virtual axis of the center Pc of the hand shape based on a change in the first length component L1 and the second length component L2.

Since an operation, such as rotation of the hand, corresponds to a change in an operation during a predetermined time interval, the image analyzing unit 314 may convert a location of each feature point and a change in each feature point into a motion vector based on a result of analysis.

The image analyzing unit 314 may detect motion of a hand shape as a pointer operation and may provide pointer operation information to an interface unit 350. For example, the image analyzing unit 314 may provide the pointer operation information based on motion of the hand shape to the interface unit 350 to implement a 3D interface. Thus, an apparatus and method for implementing a VR interface according to an embodiment of the present disclosure may facilitate 3D control on VR through a 3D analysis of an image obtained by a single camera.

Further, according to an embodiment, the image analyzing unit 314 may detect a motion pattern of a specific hand shape, that is, a pointer operation according to a user input, and may match and manage a specific instruction to the pointer operation.

The image analyzing unit 314 may derive commands matched to a motion vector stored in a volatile memory and/or a non-volatile memory and may execute the commands. The image analyzing unit 314 may have a storage medium and may manage a pointer operation matched with a command stored in the storage medium, or may derive a command matched with a pointer operation from an external storage medium. A pointer operation or a command detected by the image analyzing unit 314 may be transmitted to the interface unit 350.

For example, performing a pointer operation of drawing a quadrangle with a finger may be defined as providing an operation command to open a specific window. Continuing moving a finger in a direction distant from the image obtaining means, that is, a depth direction may be defined as providing a command to decrease size of the window. A description will be given in detail of an example of an interface through motion of a pointer with reference to FIG. 11.

According to an embodiment, the image analyzing unit 314 may derive a matched command based on each of motion vectors of the first and third feature points P1 and P3 determined based on a change in the two length components L1 and L2 or a combination thereof.

FIG. 7 is a drawing illustrating an analysis of a hand shape for describing obtaining of pointer coordinates according to an exemplary embodiment of the present disclosure.

3D coordinates may be analyzed using a feature point different from being described with reference to FIG. 6.

Referring to FIG. 7, an image extracting unit 312 may search a hand shape and may extract a feature point of a hand, from an image input in real time via an image obtaining unit 311.

In FIG. 7, a feature point may include ends P1' and P3' of two fingers, a palm feature point P2' of a palm boundary between the two fingers, and a boundary feature point P4' between a straight unfolded finger and a folded finger.

The image extracting unit 312 may extract an ROI around feature points P1' to P4' to be extracted. For example, the image extracting unit 312 may search the entire region of an image obtained in real time via the image obtaining unit 311 while linearly increasing a size of a search window. As the result of such a search, the image extracting unit 312 may compare similarity with a learnt image and may attempt to perform classification. For example, the classification may be performed using a support vector machine (SVM), a cascading classified, or the like in consideration of a scale and rotation.

The image extracting unit 312 may be the easiest to extract the fourth feature point P4' from a hand shape image. The image extracting unit 312 may optimize a search region based on a geometric relationship between a size of the search window which extracts the fourth feature point P4' and a hand shape.

For example, with respect to a right hand, the second feature point P2' may be located on the lower left around the fourth feature point P4', the first feature point P1' may be located on a second quadrant around the second feature point P2', and the third feature point P3' may be located at a vertical upper side between the fourth feature point P4' and the second feature point P2'. An approximate region for searching the first to fourth feature points P1' to P4' may correspond to an ROI.

As such, since it is unnecessary for recognizing a skeleton of the entire hand shape if an ROI is extracted using only a boundary portion between two fingers, more simple image processing may be performed.

An image tracking unit 313 may track a change in a 2D length component configured with feature points of an ROI during a predetermined time interval. For example, the image tracking unit 313 may track a change in a first length component L1' between the first feature point P1' and the second feature point P2', a change in a second length component L2' between the second feature point P2' and the third feature point P3', and a change in a third length component L3' between the second feature point P2' and the fourth feature point P4'.

An image analyzing unit 314 may analyze a change in 3D coordinates of at least one of the feature points P1' to P4' based on the change in each of the length components L1' to L3' and may derive a motion vector of feature points during a predetermined time interval to obtain relative 3D pointer coordinates. In another embodiment, the image analyzing unit 314 may obtain 3D pointer coordinates and may detect a pointer operation, thus deriving a command based on the pointer operation.

As shown in Table 2, the image analyzing unit 314 may estimate a change in a coordinate of a depth direction for each of the feature points P1' to P3' based on a change in a length of at least one of the length components L1' to L3'. The third length component L3' may be added to Table 2 as compared with Table 1. Although the third length component L3' is added, determination for first to seventh cases may be substantially the same as that described with reference to Table 1. As the third length component L3' is tracked, determination for eighth and ninth cases may be further performed.

TABLE 2

| Case | Change in length component | | | Change in coordinates of depth direction | | |
|---|---|---|---|---|---|---|
| | L1' | L2' | L3' | P1' | P3' | P4' |
| 1 | Decrease in length | Decrease in length | Decrease in length | Increase | Increase | Increase |
| 2 | Increase in length | Increase in length | Increase in length | Decrease | Decrease | Decrease |
| 3 | No change | Decrease in length | Decrease in length | No change | Increase | Increase |
| 4 | No change | Increase in length | Increase in length | No change | Decrease | Decrease |
| 5 | Decrease in length | No change | No change | Increase | No change | No change |
| 6 | Increase in length | No change | No change | Decrease | No change | No change |
| 7 | No change | No change | No change | No change | No change | No change |
| 8 | No change | Decrease in length | No change | No change | Increase | No change |
| 9 | No change | Increase in length | No change | No change | Decrease | No change |

In the first case, since all of the first to third length components L1' to L3' decrease, it may be determined that the entire hand is becoming distant from an image obtaining means. In the second case, since all of the first to third length components L1' to L3' increase, it may be determined that the entire hand is close toward an image obtaining means.

In the third case, since there is no change in the first length component L1', but since the second and third length components L2' and L3' decrease in length, it may be determined as an operation of rotating the entire wrist to point to the bottom. In this case, it may be determined that the third feature point P3' and the fourth feature point P4' increase in a coordinate of a depth direction.

Comparing the third case of Table 2 with the third case of Table 1, although the changes in the first length component L1' and the second length component L2' are the same as each other, since the third length component L3' decreases in length together, it may be additionally determined as a coordinate of a depth direction of the entire hand as well as an index finger increases. Thus, the third case of Table 1 may be determined as an operation of an interval between (a) and (b) of FIG. 8. It may be determined that the third case of Table 2 does not correspond to this operation.

In the fourth case, in contrast, since there is no change in the first length component L1', but since the second and third components L2' and L3' increase in length, it may be determined as an operation of rotating the entire wrist and raising the index finger which faces the bottom. In this case, it may be determined that the third feature point P3' and the fourth feature point P4' decrease in a coordinate of a depth direction.

Likewise, comparing the fourth case of Table 2 with the fourth case of Table 1, since a coordinate of a depth direction of the entire hand as well as the index finger decreases, it may be determined that the entire hand as well as the index finger decreases in a coordinate of a depth direction. It may be further determined as rotation of a hand shape. The fourth case of Table 1 may be determined as an operation during an interval of (b) and (c) of FIG. 8, but it may be determined that the fourth case of Table 2 does not correspond to this operation.

In the fifth case, since the first length component L1' decreases in length and since there is no change in the second and third length components L2' and L3', as the fifth case is determined as an operation in which a thumb faces the bottom, it may be determined that the first feature point P1' increases in a coordinate of a depth direction.

In the sixth case, in contrast, since the first length component L1' increases in length, but since there is no change in the second and third length components L2' and L3', the sixth case may be determined as an operation of returning the thumb which faces the bottom again. It may be determined as the first feature point P1' decreases in a coordinate of a depth direction.

In the seventh case in which there is no change in a length component, likewise, it may be determined that there is no change in coordinates of each of the feature points P1' to P3'.

When there is no change in the first and third length components L1' and L3' and the second length component L2' increases in length, it may be determined that only the index finger faces the bottom. In this case, the third feature point P3' increases in a coordinate of a depth direction. For example, it may be determined as a tap-in operation in which the index finger faces the bottom during an interval of (a) and (b) of FIG. 8.

When there is no change in the first and third length components L1' and L3' and the second length component L2' increases in length, it may be determined that only the index which faces the bottom returns to the top. Thus, the third feature point P3' may decrease in a coordinate of a depth direction, and it may be determined as a tap-out operation in which the index finger returns again during an interval of (b) and (c) of FIG. 8.

All of 3D motion of two fingers may be determined using only the four feature points P1' to P4' without determining a skeleton of the entire hand shape and a rotation operation may be further found out, by observation of the feature points and the change in the length components based on the feature points, described with reference to FIG. 7 and Table 2.

In the present disclosure, an interface operation may be performed by assigning a command associated with each of pointer operations to each of the pointer operations according to a 3D change of a hand corresponding to a pointer.

As shown in (a) to (c) of FIG. 9, to change an angle between the first length component L1 or L1' and the second length component L2 or L2' while a length of each of the first length component L1 or L1' and the second length component L2 or L2' is kept constant may be determined as a change in 2D coordinates of the first feature point P1 or P1' and the second feature point P2 or P2'.

When coordinates of a pointer are obtained based on an image obtained by a single camera attached to a VR device in such a manner, pointer coordinates may be converted into virtual pointer coordinates based on a distance factor and a user factor. Further, a 3D image analyzing means may detect a pointer operation during a predetermined time on pointer coordinates and may provide the detected pointer operation information to an interface unit.

A description will be given of a method for converting pointer coordinates into virtual pointer coordinates with reference to FIGS. 10 and 11.

Figure 10:
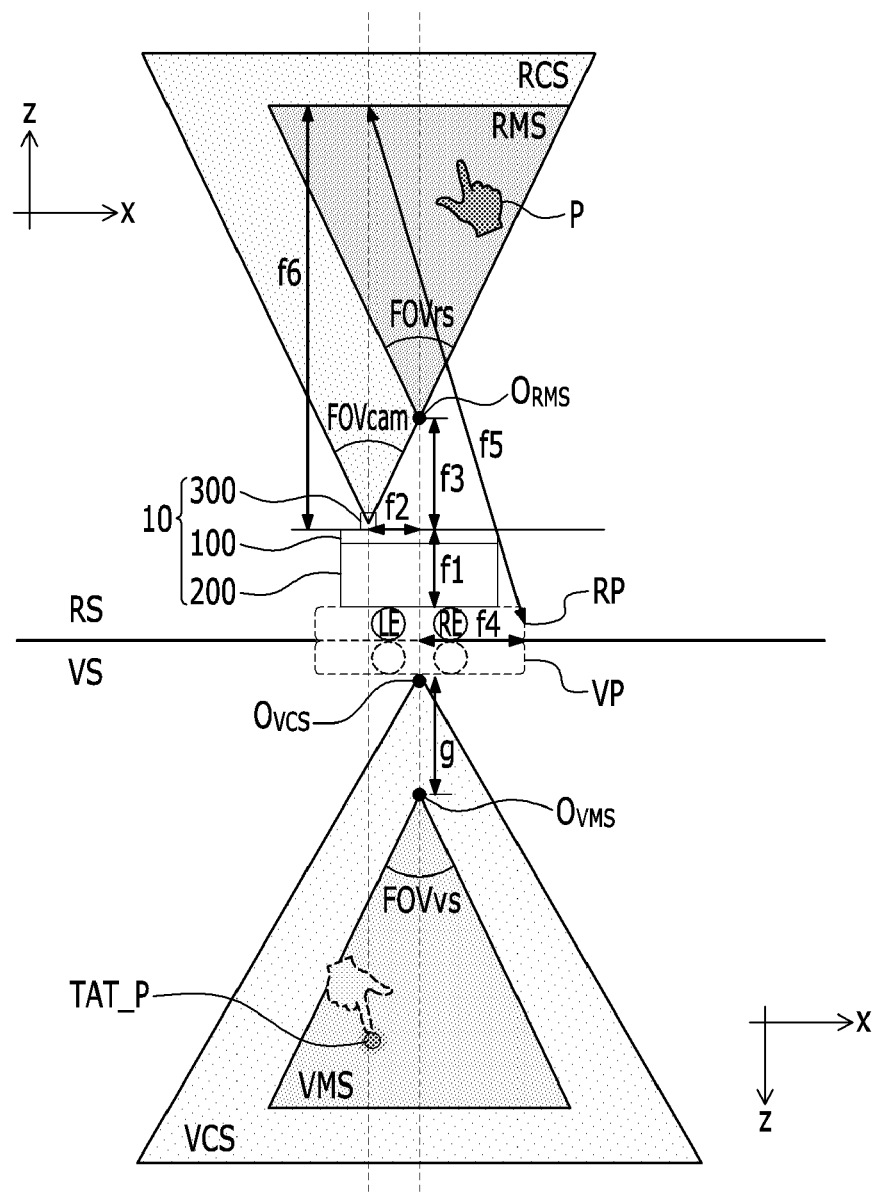
FIG. 10 is a drawing illustrating conversion of a coordinate system by assuming that an upper portion around a VR device is a real space (RS) and assuming that a lower portion around the VR device is a virtual space (VS) to describe a method for displaying VR based on a single camera according to an embodiment of the present disclosure.

FIG. 10 is a drawing illustrating conversion of a coordinate system by assuming that an upper portion around a VR device is a real space (RS) and assuming that a lower portion around the VR device is a virtual space (VS) to describe a method for displaying VR based on a single camera according to an embodiment of the present disclosure.

The RS may be defined by a relationship between eyes LE and RE of a reap player RP who wears an apparatus 10 for implementing a VR interface and a VR device 100, a single camera 300, and a fixing device 200 included in the apparatus 10 for implementing the VR interface.

In the specification, an embodiment is exemplified as the apparatus 10 for implementing the VR interface includes the VR device 100, the single camera 300, and the fixing device 200. The drawing is shown based on the embodiment. However, the apparatus 10 for implementing the VR interface may be sufficient to include at least one external image sensor and a means for displaying VR such that a user may recognize the VR.

Since the VR device 100 is located in front of eyes of the real player RP of the real space RS, view of the real player RP for the real space RS may be blocked. The present disclosure may provide a method for obtaining coordinates of a pointer, such as a hand of the real player RP, for performing interface control on VR through an image of the real space RS, obtained by the single camera 300 included in the apparatus 10 for implementing the VR interface.

Particularly, the present disclosure may obtain an interface control operation of the real player RP on the real space RS via the single camera 300 and may convert the obtained interface control operation into 3D coordinates. Thus, compared with controlling VR using only eyes of a user, it is possible to control various spaces while eyes of the user are maintained without change and it is possible to perform control in a z direction, that is, a depth direction.

A space obtained via the single camera 300 may be defined as a real camera space RCS according to a field of view FOVcam of a camera. Coordinates of the real camera space RCS may be obtained by performing inverse projection matrix calculation of coordinates of the real space RS.

Meanwhile, the coordinates of the real camera space RCS may differ from eyes of the user. Further, a space in which the user actually uses an indicator, such as a hand, for perform a command, that is a pointer, may be differently defined compared with the real camera space RCS. In the present disclosure, as such, a space, which is matched to eyes of the user, in which the user may move an indicator for performing a command, may be defined as a real motion space RMS. The real motion space RMS may be extended to a maximum depth (i.e., a z-axis direction) where a hand of the user or a pointer is located, by using a point, where a central point of eyes LE and RE of the real user RP and the real camera space RCS meet as an origin point $O_{RMS}$.

The real motion space RMS may be defined based on a characteristic of the apparatus 10 for implementing the VR interface. According to an embodiment, in the apparatus 10 for implementing the VR interface, the central point of the eyes LE and RE of the real player RP may be matched to the center of the fixing device 200 of the apparatus 10 for implementing the VR interface.

A field of view FOVrs of the real motion space RMS may be the same as the field of view FOVcam of the camera.

The real motion space RMS may be defined based on a first factor f1 corresponding to a distance of a depth direction (a z-axis direction) between eyes of the user who wears the apparatus 10 for implementing the VR interface and the single camera 300, a second factor f2 corresponding to a distance of a first direction (an x-axis direction) substantially orthogonal to the depth direction between the center of the VR device 100 and the single camera 300, and a third factor f3 corresponding to a distance of the depth direction between the real camera space RCS considering the field of view FOVcam of the single camera 300 and the center of the VR device 100. In the specification, since the first to third factors f1 to f3 are characteristics determined based on a distance between the single camera 300 and the center of the VR device 100 or eyes of the user, a description will be given of an example in which the first to third factors f1 to f3 are included in a distance factor.

Further, according to an embodiment, the real motion space RMS may be converted into a virtual space based on user factors f4 to f6 defined based on body characteristics of the user, such as a height and a weight of the real player RP.

According to an embodiment, user factors, such as the fourth factor f4 corresponding to a shoulder width of the real user RP and the fifth factor f5 corresponding to an arm length of the real player RP, may be obtained from a storage unit 340 of the apparatus 10 for implementing the VR interface or from the exterior of the apparatus 10 for implementing the VR interface according to the body characteristics of the user, such as a height and a weight of the user. The sixth factor f6 may correspond to a distance of a depth direction between a depth of the real motion space RMS by the fifth factor f5 and the single camera 300.

In another embodiment, the user factor according to the body characteristic of the user may be obtained as the user inputs the user factor to the apparatus 10 for implementing the VR interface, and may be stored in the storage unit 340.

A process of converting the real camera space RCS into the real motion space RMS may follow a process of moving an origin point $O_{RCS}$ of the real camera space RCS in an x-axis direction and a z-axis direction according to the distance factor f2 between the center of the fixing device 200 and the single camera 300 and the distance factor f3, where the center of the fixing device 200 and the real camera space RCS meet, that is, the origin point $O_{RMS}$ of the real motion space RMS. In the conversion of coordinates of the real camera space RCS may not be influenced by a maximum motion distance of a z-axis direction of the real motion space RMS according to a body characteristic of the real player RP.

The apparatus 10 for implementing the VR interface may minimize incompatibility as the user uses an object (e.g., a hand) recognized as a pointer by converting pointer coordinates analyzed from an image obtained by the single camera 300 into a coordinate system which is matched to eyes of the real player RP.

There may be a need for converting the converted real motion space RMS into a virtual space VS. A virtual player VP corresponding to the real player RP may be set on the virtual space VS, and the real motion space RMS may be converted into a virtual motion space VMS. A process where the real motion space RMS is converted into the virtual motion space VMS may follow a spatial rate between the real space RS and the virtual space VS.

The spatial rate between the real space RS and the virtual space VS may be determined based on a rate of a maximum motion distance of the real motion space RMS of the real player RP of the real space RS, that is, the maximum motion distance f5 included in a user factor according to a body characteristic of the user and a scale parameter of the virtual space VS. The scale parameter of the virtual space VS may be a predetermined value which may vary according to a setting of a designer who designs the virtual space VS.

Thus, except only the spatial rate, the virtual motion space VMS may be a space to which the real motion space RMS is equally projected. Since coordinates of VR are identical to coordinates of a virtual camera space VCS, coordinates of the virtual motion space VMS should be converted into coordinates of the virtual camera space VCS. As such, since a field of view FOVvs of the converted virtual motion space VMS is a field of view which is displayed to the user on the virtual space VS, it may be felt to be the same as the field of view FOVcam of the camera.

To match an origin point $O_{VMS}$ of the virtual motion space VMS with an origin point $O_{VCS}$ of the virtual camera space VCS, translation matrix calculation may be performed by a seventh factor g in a z-axis direction. Herein, the seventh factor g may be determined according to the first factor f1 and the third factor f3 corresponding to a distance between eyes of the real player RP and the origin point $O_{RMS}$ and a spatial rate between the real space RS and the virtual space VS. For example, the seventh factor g may be determined according to a spatial rate between the sum of the first factor f1 and the third factor f3, and the virtual space VS.

Pointer coordinates P, such as a hand operation of the user, may be converted into virtual pointer coordinates TAT_P, and the converted virtual pointer coordinates TAT_P may be displayed on the VR, through the above-mentioned process. Referring to FIG. 10, the process of converting the pointer coordinates into the virtual pointer coordinates through the expression of converting a specific space. Converting a space may be understood as the same concept as converting a coordinate system for representing a space.

Since it is necessary for a distance factor and a user factor to convert the pointer coordinates into the virtual pointer coordinates, there may be a need for a process of obtaining or deriving the distance factor and the user factor.

Figure 11:
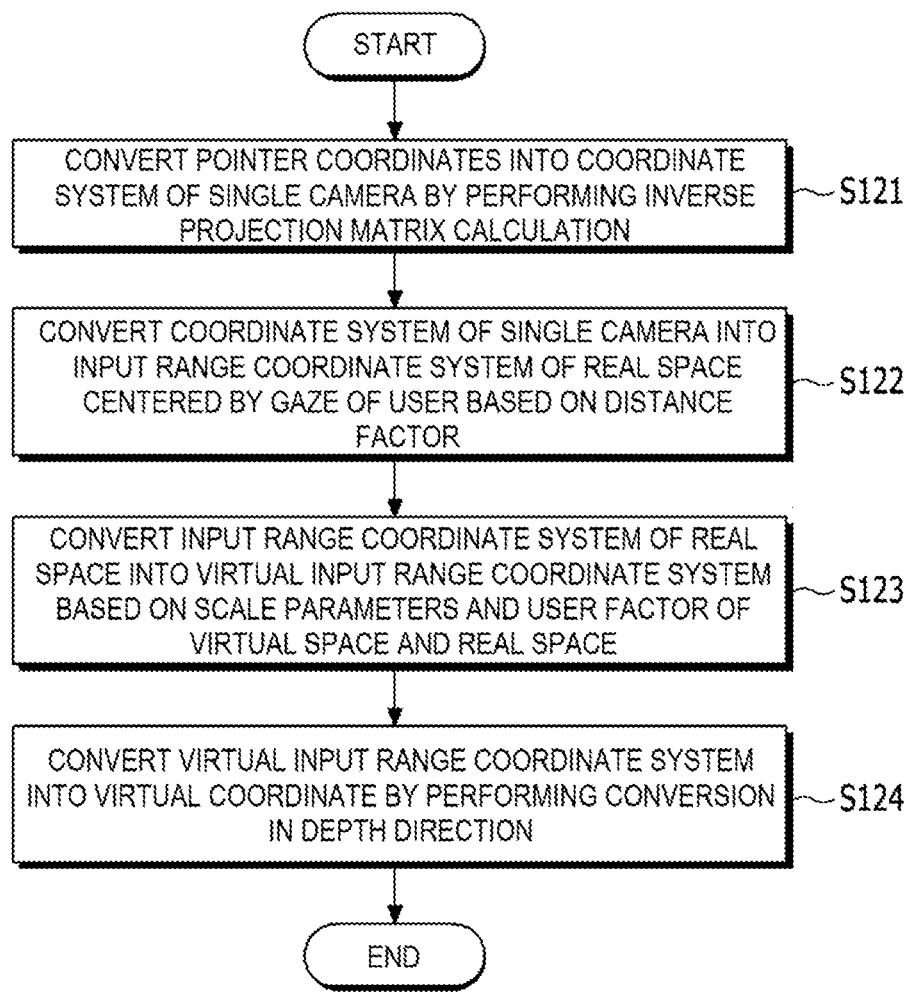
FIG. 11 is a flowchart illustrating converting pointer coordinates into virtual pointer coordinates in a method for implementing a VR interface based on a single camera according to an embodiment of the present disclosure.

FIG. 11 is a flowchart illustrating a step of converting pointer coordinates into virtual pointer coordinates in a method for implementing a VR interface based on a single camera according to an embodiment of the present disclosure.

Steps shown in FIG. 11 may be performed by a virtual coordinate converting means 320 of FIG. 2.

Referring to FIG. 11, in step S121, pointer coordinates may be converted into a coordinate system of a single camera by performing inverse projection matrix calculation. This may correspond to a process of converting a real space RS into a real camera space RCS in FIG. 10.

In step S122, a real space coordinate converting unit 321 included in the virtual coordinate converting means 320 may convert the coordinate system RCS of the single camera into an input range coordinate system of a real space RS around a gaze of a user based on a distance factor. This step may correspond to a process of converting the real camera space RCS into a real motion space RMS described with reference to FIG. 10.

The real space coordinate converting unit 321 may convert the real camera space RCS into the real motion space RMS based on a distance factor provided from a storage unit 340 or a distance factor obtained in a registration process and so on. In detail, the real space coordinate converting unit 321 may convert a coordinate system through translation matrix calculation to match an origin point $O_{RCS}$ of the real camera space RCS to an origin point $O_{RMS}$ of the real motion space RMS.

For example, the translation matrix may follow a second factor f2 in an x-axis direction and a third factor f3 in a z-axis direction. It may be assumed that the real camera space RCS and the real motion space RMS are the same as each other in a y-axis direction.

In step S123, a virtual space coordinate converting unit 323 included in the virtual coordinate converting means 320 may convert the input range coordinate system of the real space RS into a virtual input range coordinate system based on a scale parameter of a virtual space VS and the real space RS and a user factor. This step may correspond to a process of converting the real motion space RMS into a virtual motion space VMS described with reference to FIG. 10. As described above, a spatial rate between the real space RS and the virtual space VS may be determined based on a rate of a fifth factor f5 included in a user factor and a scale parameter of the virtual space VS.

Finally, in step S124, the virtual space coordinate converting unit 323 may convert the pointer coordinates into virtual pointer coordinates by converting the virtual input range coordinate system in a depth direction. This step may correspond to a process of converting a virtual motion space VMS into a virtual camera space VCS described with reference to FIG. 10. The virtual input range coordinate system may be converted in the depth direction based on the sum of a distance of the depth direction between a point, where the center of a VR device 100 and a coordinate space of a single camera considering a field of view FOVcam of a coordinate system of the single camera meet, or sum of a distance in depth direction between the origin point $O_{RMS}$ of the real motion space RMS and the VR device 100 and a distance between eyes of a user and the VR device 100, that is, a first factor f1 and a third factor f3.

As such, pointer coordinates obtained through an image obtained by the single camera may be converted into virtual pointer coordinates, and the converted virtual pointer coordinates may be displayed on the VR device 100. A manner of displaying the virtual pointer coordinates on the VR device 100 may be implemented as various manners. In the present disclosure, the virtual pointer coordinates may be displayed, and various types of 3D interfaces may be performed through a pointer of the displayed virtual pointer coordinates.

Thus, since it is possible to access only an object located on a straight line which is identical to a head direction of a user, such as a gaze pointer, on conventional VR, there may be several limits to an interface. However, a pointer converted into virtual pointer coordinates in the present disclosure may access and interact with all objects on a 3D space of VR.

FIGS. 12 to 18 are drawings illustrating interface methods according various changes in virtual pointer coordinates.

FIGS. 12 to 18 are drawings illustrating one operation determined through a change in pointer coordinates or virtual pointer coordinates during a predetermined time interval. In FIGS. 12 to 18, one pointer operation may be recognized through a change of a pointer. Such pointer operations may be linked with a specific command and may facilitate a 3D interface on VR.

According to an embodiment, recognition of a pointer operation according to FIGS. 12 to 18 may be performed by a 3D image analyzing means 310 of FIG. 2. The 3D image analyzing means 310 may determine a pointer operation based on a change in pointer coordinates during a predetermined time or a motion vector derived from the change in the pointer coordinates and may provide an internally linked command to an interface unit 350. According to an embodiment, pointer operation information provided via the 3D image analyzing means 310 may be provided to the interface unit 350. The interface unit 350 may be implemented to derive a command associated with a pointer operation and perform an interface operation.

Further, according to an embodiment, the interface unit 350 may track information, in which pointer coordinates provided via the 3D image analyzing means 310 are converted into virtual pointer coordinates, itself during a predetermined time interval and may detect a pointer operation.

FIGS. 12 to 18 illustrate screens displayed on a VR device. According to an embodiment, a hand shape may not be displayed on the VR device, and only virtual pointer coordinates TAP_P may be displayed on the VR device.

In FIGS. 12 to 18, as described with reference to FIGS. 6 and 7, a description will be given of a first length component L1 between a palm feature point and an end of a thumb and a second length component L2 between the palm feature point and an end of an index finger.

Figure 12:
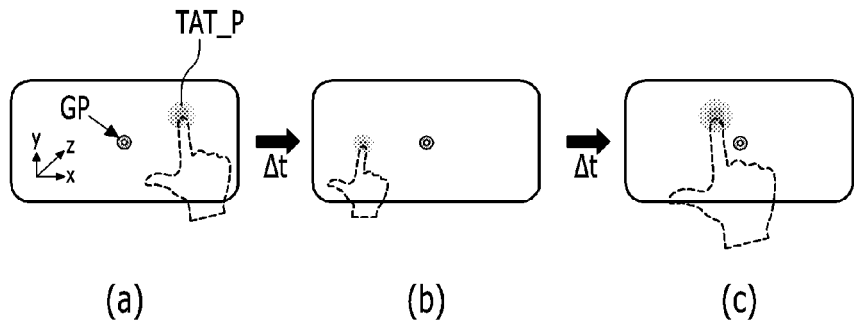
FIGS. 12 to 18 are drawings illustrating interface methods according various changes in virtual pointer coordinates.

FIG. 12 illustrates operations in which pointer feature of a user simply move, particularly, operations in which an index finger continuously moves through (a) to (c). There may be no change of a relative rate of length components which connect feature points of fingers in FIG. 12. Further, there may be no change in an angle between length components through (a) to (c). Herein, the entire length component may decrease and increase in length. Thus, it may be determined that the operations of FIG. 12 is performed together with an operation in which a hand is distant and close while feature points constituting the length components simply move. A z direction of virtual pointer coordinates may be displayed to increase and decrease in size according to a result of determining a coordinate of this depth direction.

Figure 13:
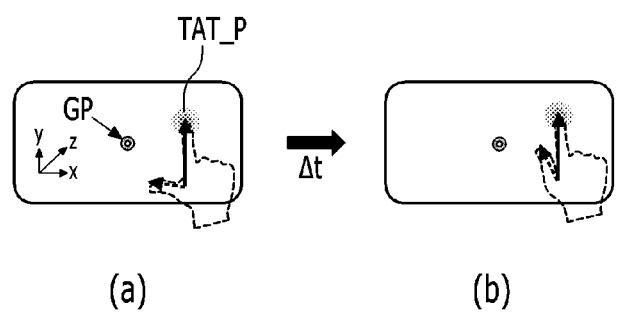

In FIG. 13, there may be no change in a length of each of 2D length components (e.g., length components L1 and L2 of FIG. 6 or length components L1' and L2' of FIG. 7) configuring a hand shape. FIG. 13 illustrates an operation in which an angle between length components decreases in an interval of (a) and (b) in FIG. 13. This operation may be determined as a thumb-in operation.

Figure 14:
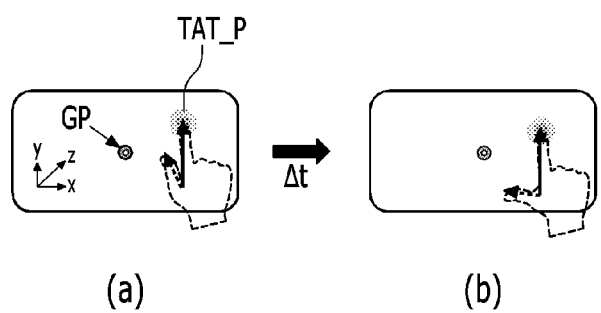

In FIG. 14, to the contrary of being shown in FIG. 13, it may be verified that there is no change in a length of a 2D length component configuring a hand shape, whereas an operation in which an angle between length components increases in an interval of (a) and (b) in FIG. 14 is accomplished. This operation may be determined as a thumb-out operation.

Figure 15:
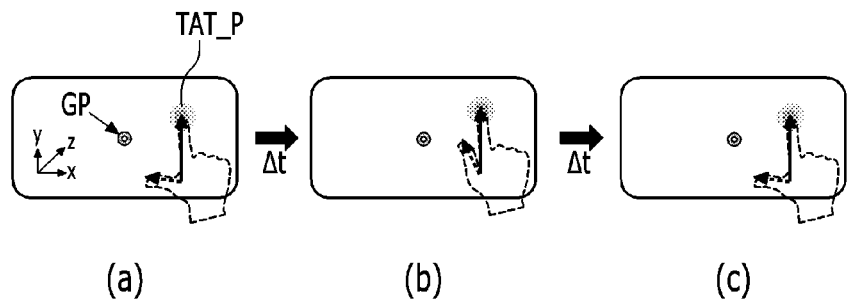

In FIG. 15, similar to being described with reference to FIGS. 13 and 14, it may be verified that there is no change in a length of a 2D length component configuring a hand shape, whereas an operation, in which an angle between length components decreases in an interval of (a) and (b) in FIG. 15 and in which the angle increases in an interval of (b) and (c) in FIG. 15, is accomplished. This is implemented to sequentially perform the thumb-in operation and the thumb-out operation and may be determined as a thumb-click operation through the entire operation. For example, in the present disclosure, one pointer operation (the thumb-in operation) and another pointer operation (the thumb-out operation) subsequent within a predetermined time interval may be combined to be defined as another pointer operation (the thumb-click operation).

Figure 16:
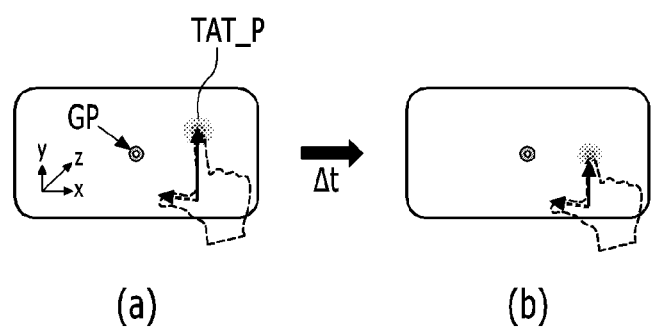

It may be verified that there is no change in a first length component in an interval of (a) and (b) in FIG. 16, but a second length component decreases in length. Such an operation may be analyzed as an operation in which an index finger is distant from a single camera and may be determined as a tap-in operation.

Figure 17:
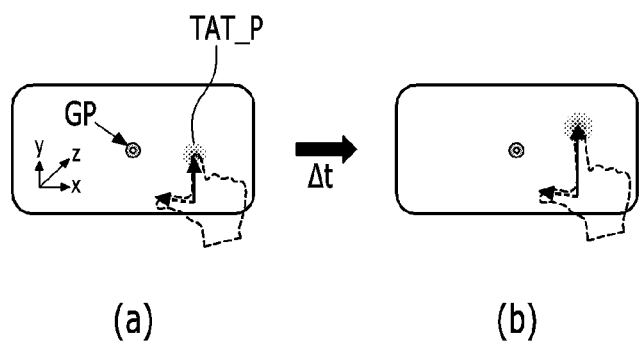

It may be verified that there is no change in a first length component, but a second length component increases in length in an interval (a) and (b) in FIG. 17. Such an operation may be analyzed as an operation in which an index finger is close to the single camera and may be determined as a tap-out operation.

Figure 18:
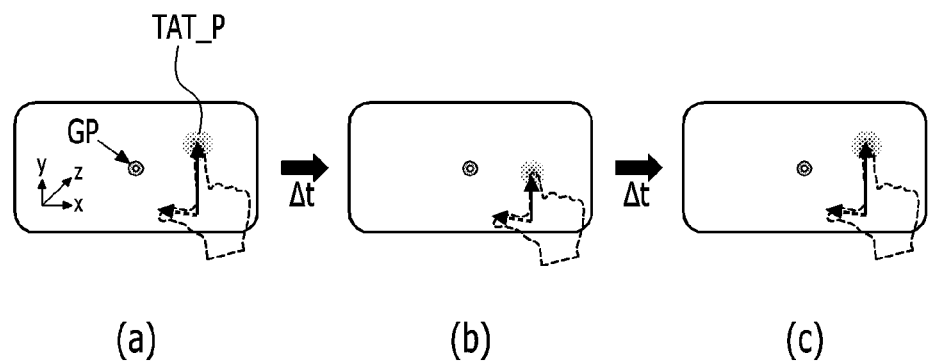

It may be verified that there is no change in a first length component in an interval of (a) and (b) in FIG. 18, but a second length component decreases in the interval of (a) and (b) of FIG. 18 and the second length component increases in an interval of (b) and (c) in FIG. 18. This may be implemented to sequentially perform the tap-in operation and the tap-out operation described with reference to FIGS. 16 and 17 to be determined as a tap-click operation.

A method and apparatus for implementing a VR interface based on a single camera according to an embodiment of the present disclosure may perform various commands by analyzing the various operations. Whether any command is performed may vary according to a performed operation. Particularly, in the method for implementing the VR interface, when the pointer coordinates are implemented to be matched to a gaze pointer, a different interface may be performed.

Figure 19:
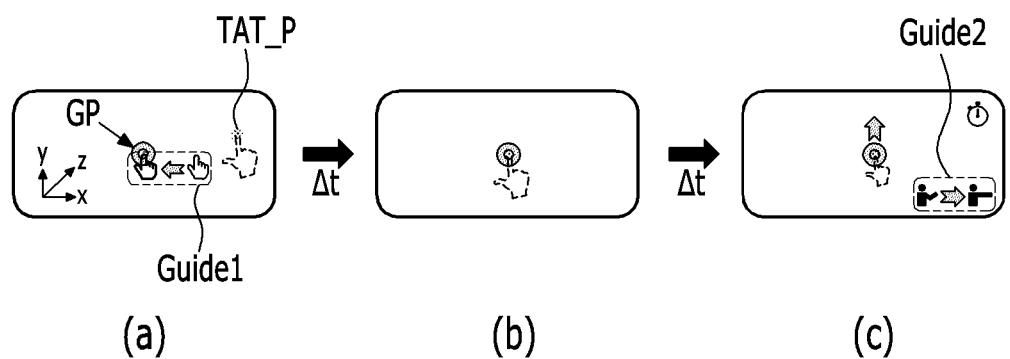
FIGS. 19 to 21 are drawings illustrating examples of an interface method according to interaction between virtual pointer coordinates and a gaze pointer in a method and apparatus for implementing a VR interface.
Figure 20:
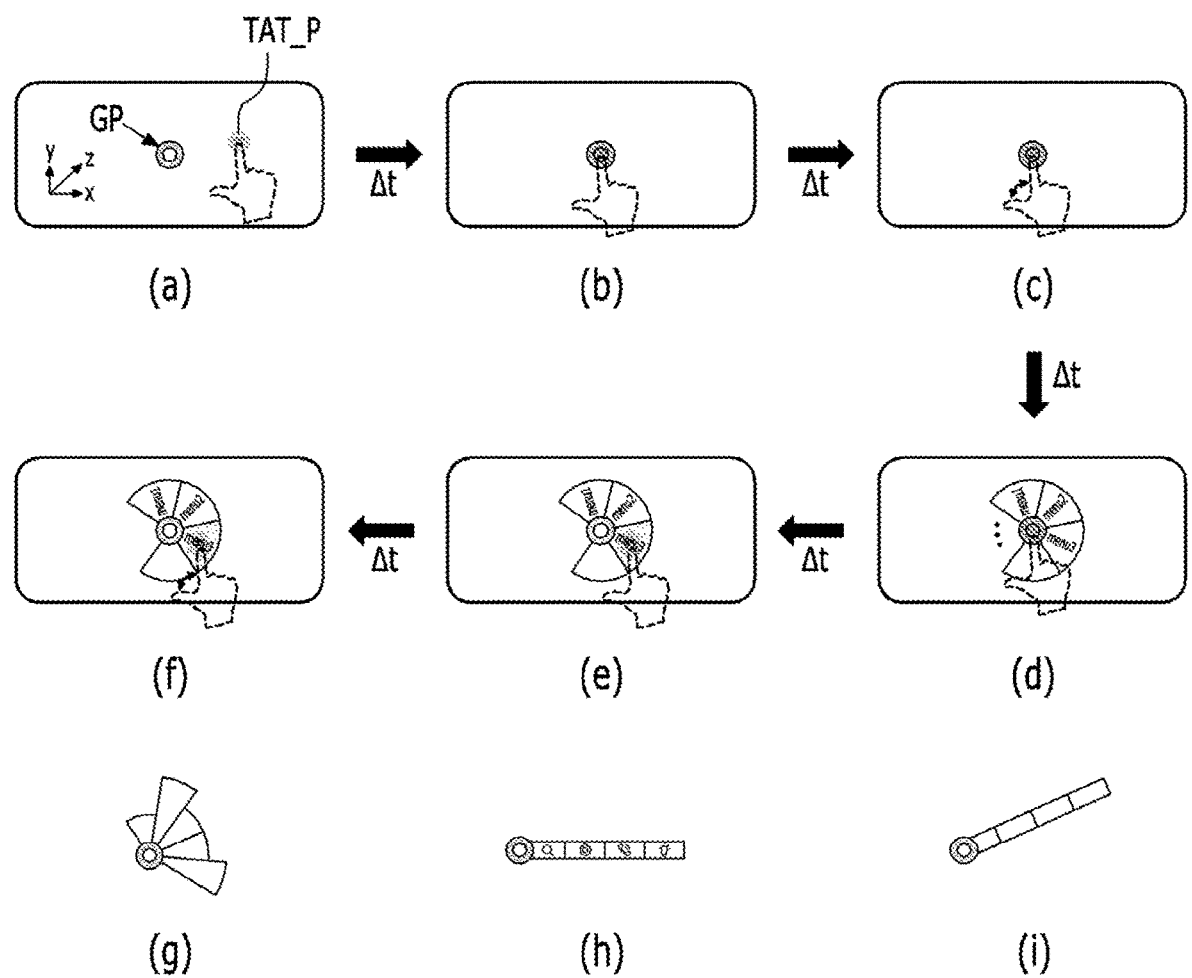
Figure 21:
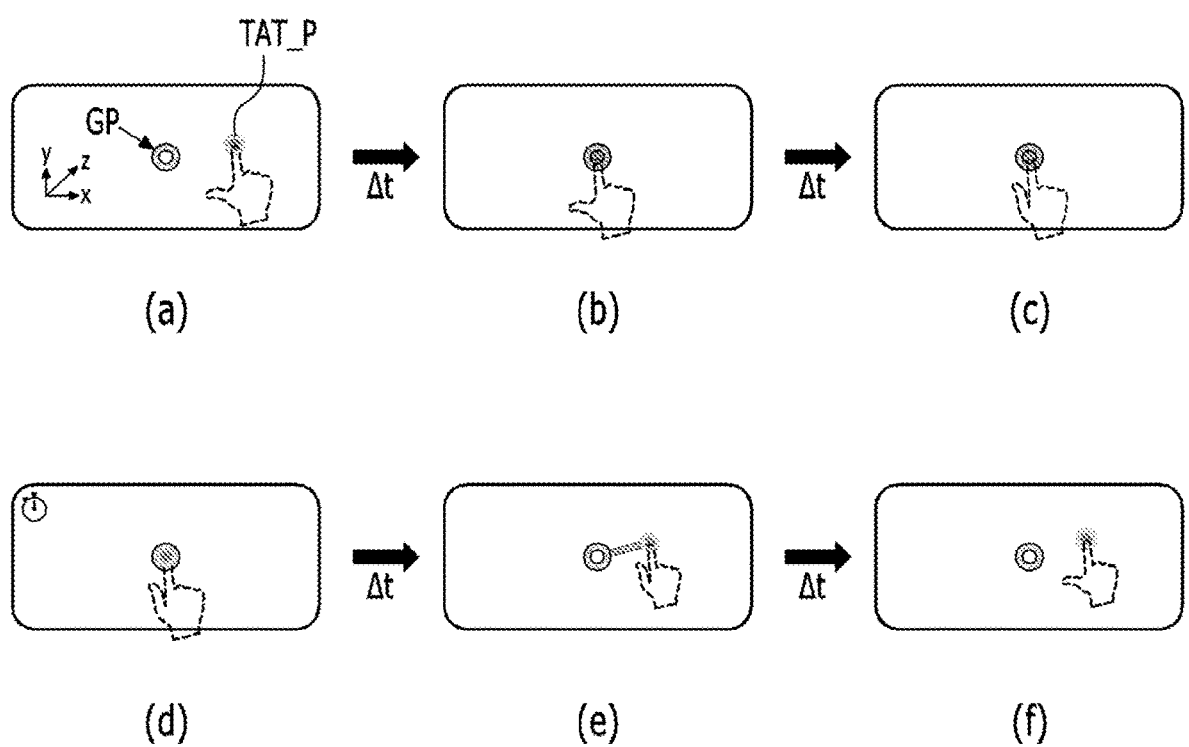

FIGS. 19 to 21 are drawings illustrating examples of an interface method according to interaction between virtual pointer coordinates and a gaze point in a method and apparatus for implementing a VR interface.

FIG. 19 illustrates an example of a user registration process through (a) to (c). According to an embodiment, a VR device may display a guide screen for matching a gaze pointer GP to virtual pointer coordinates TAT_P during a motion operation and may guide a user to register himself or herself. In other words, to obtain a distance factor and a user factor for converting pointer coordinates into virtual pointer coordinates, a guide screen shown in FIG. 19 may be provided to the user.

In (a) of FIG. 19, a guide image guide1 for matching the virtual pointer coordinates TAT_P to the gaze pointer GP may be displayed. In (b) of FIG. 19, the virtual pointer coordinates may be matched to the gaze point. When the user stretches his or her hand to be long as far as possible, since a user factor are more accurately determined, an additional guide image guide2 may be further displayed in (c) of FIG. 19.

FIG. 20 illustrates an example of executing a sub-menu by matching virtual pointer coordinates to a gaze pointer and performing a pointer operation.

Virtual pointer coordinates TAT_P may move during an interval of (a) and (b) in FIG. 20 to match the virtual pointer coordinates TAT_P to a gaze pointer GP. In the matched condition, a thumb-click operation described with reference to (a) to (c) in FIG. 15 may be performed in (c) of FIG. 20.

An interface unit 350 may determine that a sub-menu is selected by a command associated with a pointer operation by the pointer operation recognized according to performance of the thumb-click operation and may display a menu shown in (d) of FIG. 20. When a user moves the virtual pointer coordinates TAT_P to select a specific menu in (e) of FIG. 20 in a state where the menu is displayed and performs the thumb-click operation again in (f) of FIG. 20, the interface unit 350 or a 3D image analyzing means 310 may recognize a pointer operation. Thus, the recognized menu may be performed.

In detail, when information in which a pointer operation is recognized by the 3D image analyzing means 310 is provided to the interface unit 350, the interface unit 350 may ascertain a current location of virtual pointer coordinates on a VR interface. When a pointer operation is performed on the location of the virtual pointer coordinates, the interface unit 350 may analyze a command associated with the pointer operation and may perform an interface operation.

In another embodiment, recognizing a pointer operation through the virtual pointer coordinates, the interface unit 350 may internally derive a command associated with a current location of virtual pointer coordinates, a location of a gaze pointer, and a pointer operation and may perform an interface operation.

For example, it may be verified that the thumb-click operation is associated with a selection command and that an interface operation for selecting a menu where a virtual pointer is located is performed.

According to an embodiment, various types of menus, such as a fan shape, a quadrangle, and a radial shape, may be displayed on a VR device in (g) to (i) of FIG. 20.

FIG. 21 is drawing illustrating an example of an interface for moving a user of a virtual space.

A virtual motion space VMS (see FIG. 10) on a virtual space may be a 3D virtual space which is accessible through virtual pointer coordinates with respect to a location of a virtual player VP. Since the virtual motion space VMS are determined by a current location of the virtual player VP, if a location of the virtual player VP moves, the virtual motion space VMS may also be changed.

Motion of the virtual player VP on a virtual space may be performed by performing a thumb-in operation in (b) and (c) of FIG. 21 in a state where a gaze pointer GP and virtual pointer coordinates TAT_P are matched to each other in (b) of FIG. 21, maintaining the thumb-in operation during a predetermined time to an interval until (d) of FIG. 21, and dragging the gaze pointer GP in (e) of FIG. 21, that is, performing a drag operation. The user may move the virtual pointer coordinates TAT_P in x and z directions in a state where the gaze pointer GP is dragged to move a location of the virtual player VP. When the user ends motion of the gaze pointer GP, he or she may perform a thumb-out operation in (f) of FIG. 21 to release a drag operation.

As such, contrary to moving a virtual space as a real player moves, due to implementing the VR interface, a location of a virtual player may move by only a simple control operation.

Further, as described with reference to FIG. 21, one command may be associated with one pointer operation, alternatively a series of pointer operations may be associated with perform one command. As described above, a pointer operation and a command associated with the pointer operation may be stored in a 3D image analyzing means 310 or may be managed by a storage unit 340 or an interface unit 350. Further, the pointer operation and the command associated with the pointer operation may be defined in a different way according to a setting of the user in the exterior.

The method and the apparatus for implementing the VR interface according to various embodiments of the present disclosure may obtain pointer coordinates by three-dimensionally analyzing a control operation of the user through a single camera and may display the obtained pointer coordinates on a VR space without separation.

A variety of interface operations may be performed by a control operation of the user on a VR space through such a process.

The method and the apparatus for implementing the VR interface based on the single camera according to an embodiment of the present disclosure may obtain pointer coordinates by determining 3D depth information for an image obtained by the single camera through the above-mentioned method. In addition, the method and the apparatus for implementing the VR interface based on the single camera according to an embodiment of the present disclosure may display virtual pointer coordinates on a VR space without gap by converting and displaying three-dimensionally determined pointer coordinates into VR according to a factor derived according to a characteristic of a VR device and a characteristic of a user of the VR device.

In the present disclosure, a computer-readable storage medium which stores a program for performing the above-mentioned method for implementing the VR interface based on the single camera may be included in the scope of the present disclosure. For example, a storage medium which stores computer-readable program instructions may include a hard disk, a floppy disk, a magnetic media (e.g., a magnetic tape), an optical media (e.g., a compact disc read only memory (CD-ROM) and a digital versatile disc (DVD)), a magneto-optical media (e.g., a floptical disk), and hardware devices (e.g., a read only memory (ROM), a random access memory (RAM), or a flash memory). Also, a program command may include not only a mechanical code such as things generated by a compiler but also a high-level language code executable on a computer using an interpreter. The above hardware unit may be configured to operate as one or more software modules for performing an operation of various embodiments of the present disclosure, and vice versa.

A system according to various embodiments may include at least one or more of the above-mentioned elements, or a part of the above elements may be omitted, or additional other elements may be further included. Embodiments disclosed in present disclosure are provided for describing and understanding disclosed technical details and are not intended to be limited to the scope of the present disclosure. Therefore, it should be interpreted that the scope of the present disclosure includes all modifications or various other embodiments based on the spirit and scope of the present disclosure.

The invention claimed is:

1. A method for implementing a virtual reality (VR) interface based on a single camera, the method comprising:
    obtaining pointer coordinates based on an image obtained by the single camera attached to a VR device;
    converting the pointer coordinates into virtual pointer coordinates based on a distance factor between the single camera and the VR device and a user factor including an input range of a real space derived according to a body characteristic of a user; and displaying the converted virtual pointer coordinates on the VR device, wherein the obtaining of the pointer coordinates based on the image obtained by the single camera attached to the VR device comprises:

storing the image obtained by the single camera on a frame-by-frame basis;

determining a plurality of feature points configuring a hand shape of the user, the hand shape being included in the stored image, and extracting a region of interest (ROI) based on the feature points;

tracking a change in a 2D length component configured with feature points of the ROI during a predetermined time interval; and obtaining relative 3D pointer coordinates by analyzing a change in 3D coordinates of the feature points based on the change in the 2D length component and deriving a motion vector of the feature points during the predetermined time interval based on the analysis, wherein the converting of the pointer coordinates into the virtual pointer coordinates comprises:

converting the pointer coordinates into a coordinate system of the single camera by performing inverse projection matrix calculation;

converting the coordinate system of the single camera into an input range coordinate system of a real space around the VR device based on the distance factor;

converting the input range coordinate system of the real space into a virtual input range coordinate system based on a scale parameter and the user factor of a virtual space and the real space; and converting the pointer coordinates into the virtual pointer coordinates by performing conversion in a depth direction with respect to the virtual input range coordinate system.

2. The method of claim 1, wherein the performing of the conversion in the depth direction with respect to the virtual input range coordinate system comprises:

performing the conversion in the depth direction based on a distance of the depth direction between a center of the VR device and an origin point of the input range coordinate system of the real space and a distance of the depth direction between the VR device and a gaze of the user.

3. The method of claim 1, wherein the distance factor comprises:

a first factor corresponding to a distance of the depth direction between a gaze of the user who wears the VR device and the single camera;

a second factor corresponding to a distance of a first direction substantially orthogonal to the depth direction between the center of the VR device and the single camera; and a third factor corresponding to a distance of the depth direction between a real camera space considering a field of view of the single camera and the center of the VR device, and wherein the converting of the coordinates of the single camera into the input range coordinate system of the real space around the gaze of the user comprises:

performing the conversion in the depth direction based on the first factor and the third factor; and performing conversion in the first direction based on the second factor.

4. The method of claim 3, wherein the converting of the pointer coordinates into the virtual pointer coordinates by performing the conversion in the depth direction with respect to the virtual input range coordinate system comprises:

converting the pointer coordinates into the virtual pointer coordinates by performing the conversion in the depth direction based on the scale parameter and the third factor.

5. The method of claim 1, further comprising:

displaying a guide screen for matching 2D coordinates of at least one feature point of the hand shape of the user, the 2D coordinates being displayed as the virtual pointer coordinates, to a gaze pointer of the VR device.

6. The method of claim 1, wherein the converting of the pointer coordinates into the virtual pointer coordinates comprises:

deriving at least one of the distance factor and the user factor based on a user identifier.

7. The method of claim 1, wherein the displaying of the converted virtual pointer coordinates on the VR device comprises:

when a predetermined pointer operation is performed in a state where the converted virtual pointer coordinates are matched to coordinates of a selection unit of the VR device, performing a sub-command associated with the selection unit.

8. The method of claim 7, further comprising:

determining an operation indicated by the hand shape based on a converted motion vector; and regarding the determined operation as a pointer operation.

9. The method of claim 8, wherein the selection unit corresponds to a gaze pointer of the user, and wherein a virtual space of VR moves by performing a pointer operation corresponding to an operation in which the virtual pointer coordinates are dragged during a predetermined time interval in a state where the gaze point is matched to the converted virtual pointer coordinates.

10. A non-transitory computer-readable storage medium storing a program for performing the method of claim 1.

11. An apparatus for implementing a VR interface based on a single camera, the apparatus comprising:

a 3D image analyzing means configured to obtain pointer coordinates based on an image obtained by the single camera attached to a VR device;

a virtual pointer coordinate converting means configured to convert the pointer coordinates into virtual pointer coordinates based on a distance factor between the single camera and the VR device and a user factor including an input range of a real space derived according to a body characteristic of a user; and a display means configured to display the converted virtual pointer coordinates on the VR device, wherein the 3D image analyzing means comprises:

an image obtaining unit configured to store the image obtained by the single camera on a frame-by-frame basis;

an image extracting unit configured to determine a plurality of feature points configuring a hand shape of the user, the hand shape being included in the stored image, and extract a region of interest (ROI) based on the feature points;

an image tracking unit configured to track a change in a 2D length component configured with feature points of the ROI during a predetermined time interval; and an image analyzing unit configured to obtain relative 3D pointer coordinates by analyzing a change in 3D coordinates of the feature points based on the change in the 2D length component and deriving a motion vector of the feature points during the predetermined time interval based on the analysis, wherein the virtual pointer coordinate converting means comprises:
- a real space coordinate converting unit configured to convert the pointer coordinates into a coordinate system of the single camera by performing inverse projection matrix calculation and convert the coordinate system of the single camera into an input range coordinate system of a real space which uses a gaze of the user as an origin point, based on the distance factor; and
- a virtual space coordinate converting unit configured to convert the input range coordinate system of the real space into a virtual input range coordinate system based on a scale parameter and the user factor of a virtual space and the real space and convert the pointer coordinates into the virtual pointer coordinates by performing conversion in a depth direction with respect to the virtual input range coordinate system.

12. The apparatus of claim 11, wherein the virtual pointer coordinate converting means further comprises: a storage unit configured to manage the distance factor and the user factor for each user and for each VR device.

13. The apparatus of claim 12, wherein the storage unit manages a user factor database according to a characteristic of the single camera for each type of a specific VR device and a body characteristic of the user.

14. The apparatus of claim 11, further comprising:
- an interface unit configured to determine an operation indicated by the hand shape based on a converted motion vector, regard the determined operation as a pointer operation, and perform a VR interface operation.

15. The apparatus of claim 14, wherein, if a predetermined pointer operation is performed in a state where the converted virtual pointer coordinates are matched to coordinates of a selection unit of the VR device, the interface unit performs a sub-command linked with the selection unit.

16. The apparatus of claim 15, wherein the selection unit corresponds to a gaze pointer of the user.

\* \* \* \* \*